US012762610B1

(12) United States Patent
Bliss

(10) Patent No.: US 12,762,610 B1
(45) Date of Patent: Oct. 13, 2026

(54) SYSTEM AND METHOD FOR AI-DRIVEN MARKETING AUTOMATION ACROSS DIGITAL CHANNELS

(71) Applicant: Derrick Bliss, Floral Park, NY (US)

(72) Inventor: Derrick Bliss, Floral Park, NY (US)

( * ) Notice: Subject to any disclaimer, the term of this patent is extended or adjusted under 35 U.S.C. 154(b) by 0 days.

(21) Appl. No.: 19/206,829

(22) Filed: May 13, 2025

(51) Int. Cl.
*G06Q 30/06* (2023.01)
*G06Q 10/40* (2026.01)
*G06Q 30/0241* (2023.01)
*G06Q 30/0601* (2023.01)

(52) U.S. Cl.
CPC ......... *G06Q 30/0641* (2013.01); *G06Q 10/40* (2026.01); *G06Q 30/0276* (2013.01)

(58) Field of Classification Search
CPC ....................... G06Q 30/0641; G06Q 30/0276
See application file for complete search history.

(56) References Cited

U.S. PATENT DOCUMENTS 9,516,467 B1 * 12/2016 Cronin ............... G06Q 30/0255
11,055,737 B1 * 7/2021 Dakic .................... G16H 50/20
11,423,458 B2 * 8/2022 Sharma .............. G06Q 30/0641
12,254,672 B1 * 3/2025 Stiers .................... G06F 16/538
2021/0326928 A1 * 10/2021 MacDougall ..... G06F 16/90332
2023/0046907 A1 * 2/2023 Brosnan ................. G06Q 20/20
2023/0360066 A1 * 11/2023 Carmody ................. G06N 7/01
2023/0396572 A1 * 12/2023 Heikkinen ............. G06N 20/00
2023/0419409 A1 * 12/2023 Halpin .................. G06Q 40/03

* cited by examiner

*Primary Examiner* — Scott C Anderson
(74) *Attorney, Agent, or Firm* — Shore IP Group, PLLC; Sean R. Wilsusen

(57) ABSTRACT

An artificial intelligence (AI)-driven system of performing automated digital marketing includes a graphical user interface configured to be displayed on a user device and including an adjustable graphical selector, such as a sliding lever, that allows a user to select a desired level of marketing services by adjusting the selector across a service scale including multiple service tiers. A machine learning model receives a selected position of the graphical selector, determines one or more marketing services associated with the selected service tier, and collects marketing input corresponding to a business of the user and associated with the selected services. Using the marketing input, the machine learning model generates at least one digital marketing asset. The system then transmits the generated digital marketing asset to at least one digital delivery endpoint for publication or deployment, enabling dynamic and scalable execution of marketing campaigns with minimal human intervention.

15 Claims, 22 Drawing Sheets

SYSTEM AND METHOD FOR AI-DRIVEN MARKETING AUTOMATION ACROSS DIGITAL CHANNELS

FIELD

Embodiments of the present disclosure relate to the field of digital marketing and, more particularly, to an artificial intelligence (AI)-driven system for automating digital marketing campaign configuration, execution, optimization, and multimedia content generation through an adaptive user interface.

BACKGROUND

Traditional digital marketing typically requires extensive user engagement to configure and optimize advertising campaigns, website development, and search engine optimization (SEO). Many small businesses lack the expertise or resources to effectively manage digital marketing campaigns, leading to inefficient advertising spend and suboptimal market reach.

Existing marketing platforms typically require significant manual input, such as selecting keywords, defining audience targeting, and adjusting marketing budgets. Additionally, conventional systems do not dynamically adapt marketing strategies based on real-time performance data and user-defined preferences. Furthermore, integrating multiple marketing services, such as website creation, SEO, and social media management, often requires separate platforms and manual coordination.

SUMMARY

According to an embodiment of the present disclosure, a system of performing automated digital marketing includes an artificial intelligence (AI)-driven digital marketing system in communication with a machine learning model, the AI-driven digital marketing system including a graphical user interface including an adjustable graphical selector configured to be displayed on a user device. The adjustable graphical selector is part of the graphical user interface and is configured to receive an input, from a user via the user device, indicating a desired level of marketing services in response to the user adjusting the adjustable graphical selector across a service scale including a plurality of service tiers. The machine learning model is configured to receive, from the adjustable graphical selector, a selected position corresponding to a selected service tier, determine at least one marketing service associated with the selected service tier by analyzing the selected position of the adjustable graphical selector, receive marketing input corresponding to a business of the user and associated with the determined at least one marketing service, from the user, via the graphical user interface, generate, using the marketing input, at least one digital marketing asset, and transmit the at least one digital marketing asset to at least one digital delivery endpoint.

In an embodiment, the adjustable graphical selector includes a sliding lever displayed horizontally along the service scale.

In an embodiment, the machine learning model includes an artificial neural network (ANN), and is further configured to generate onboarding data associated with the determined at least one marketing service, using the ANN, and transmit the onboarding data to at least one third-party digital platform for service activation.

In an embodiment, the machine learning model is further configured to retrieve online data associated with the business of the user from the at least one third-party digital platform, using the ANN, and supplement the marketing input with the retrieved online data, using the ANN.

In an embodiment, the at least one digital delivery endpoint is the at least one third-party digital platform.

In an embodiment, the machine learning model includes a convolutional neural network (CNN), and is further configured to analyze at least one visual asset or image associated with the business of the user, using the CNN, and supplement the marketing input with metadata extracted from the at least one visual asset or image, using the CNN.

In an embodiment, the at least one digital marketing asset includes at least one of an advertisement, website content, search engine optimization (SEO) metadata, and social media content.

In an embodiment, the at least one digital delivery endpoint includes at least one of a paid advertising network, a website hosting platform, and a social media platform.

In an embodiment, the machine learning model includes a reinforcement learning component, and is further configured to receive campaign performance data from the at least one digital delivery endpoint, where the campaign performance data includes at least one of impressions, clicks, conversions, or engagement statistics, adjust weights or parameters of the reinforcement learning component based on the campaign performance data, update the at least one digital marketing asset based on the campaign performance data, and generate and send an automated optimization summary to the user indicating that campaign performance has been adjusted.

In an embodiment, the machine learning model is further configured to generate and send an automated status update to the user indicating that the at least one marketing service corresponding to the selected service tier has been activated.

In an embodiment, movement of the adjustable graphical selector to a given position causes the AI-driven digital marketing system to dynamically configure a set of marketing services corresponding to the selected service tier, and display one or more corresponding form fields for collecting the marketing input associated with the configured services.

In an embodiment, the machine learning model includes a deep learning component trained on a training data set, and is further configured to dynamically update the graphical user interface to prompt the user for additional input based on at least one of previously received user input, learned user behavior patterns, and predicted marketing goals.

In an embodiment, the graphical user interface further includes one or more sub-selectors corresponding to the selected service tier, where each sub-selector is displayed in association with a particular marketing service enabled by the selected service tier, and where each sub-selector is configured to receive additional input from the user indicating one or more service-specific options for that particular marketing service.

According to an embodiment of the present disclosure, a computer-implemented method of performing automated digital marketing, includes displaying, via a graphical user interface displayed on a user device, an adjustable graphical selector, receiving, via the graphical user interface, an input from a user indicating a desired level of marketing services in response to the user adjusting the adjustable graphical selector across a service scale including a plurality of service tiers, receiving, via the graphical user interface, a selected position from the adjustable graphical selector corresponding to a selected service tier, determining, by a computer including at least one processor and at least one memory, at least one marketing service associated with the selected service tier by analyzing the selected position of the adjustable graphical selector, receiving, via the graphical user interface, marketing input corresponding to a business of the user and associated with the determined at least one marketing service, generating by the computer and using the marketing input, at least one digital marketing asset, and transmitting, by the computer, the at least one digital marketing asset to at least one digital delivery endpoint.

In an embodiment, the adjustable graphical selector comprises a sliding lever displayed horizontally along the service scale.

In an embodiment, the computer-implemented method further includes generating, by a machine learning model comprising an artificial neural network (ANN), onboarding data associated with the determined at least one marketing service, and transmitting, by the computer, the onboarding data to at least one third-party digital platform for service activation.

In an embodiment, the computer-implemented method further includes retrieving, by the ANN, online data associated with the business of the user from the at least one third-party digital platform, and supplementing, by the ANN, the marketing input with the retrieved online data.

In an embodiment, the at least one digital delivery endpoint is the at least one third-party digital platform.

In an embodiment, the computer-implemented method further includes analyzing, by a machine learning model including a convolutional neural network (CNN), at least one visual asset or image associated with the business of the user, and supplementing, using the CNN, the marketing input with metadata extracted from the at least one visual asset or image.

In an embodiment, the at least one digital marketing asset includes at least one of an advertisement, website content, search engine optimization (SEO) metadata, and social media content.

BRIEF DESCRIPTION OF THE DRAWINGS

Various aspects and features of the present disclosure are described hereinbelow with reference to the drawings, wherein.

DETAILED DESCRIPTION

Figure 1:
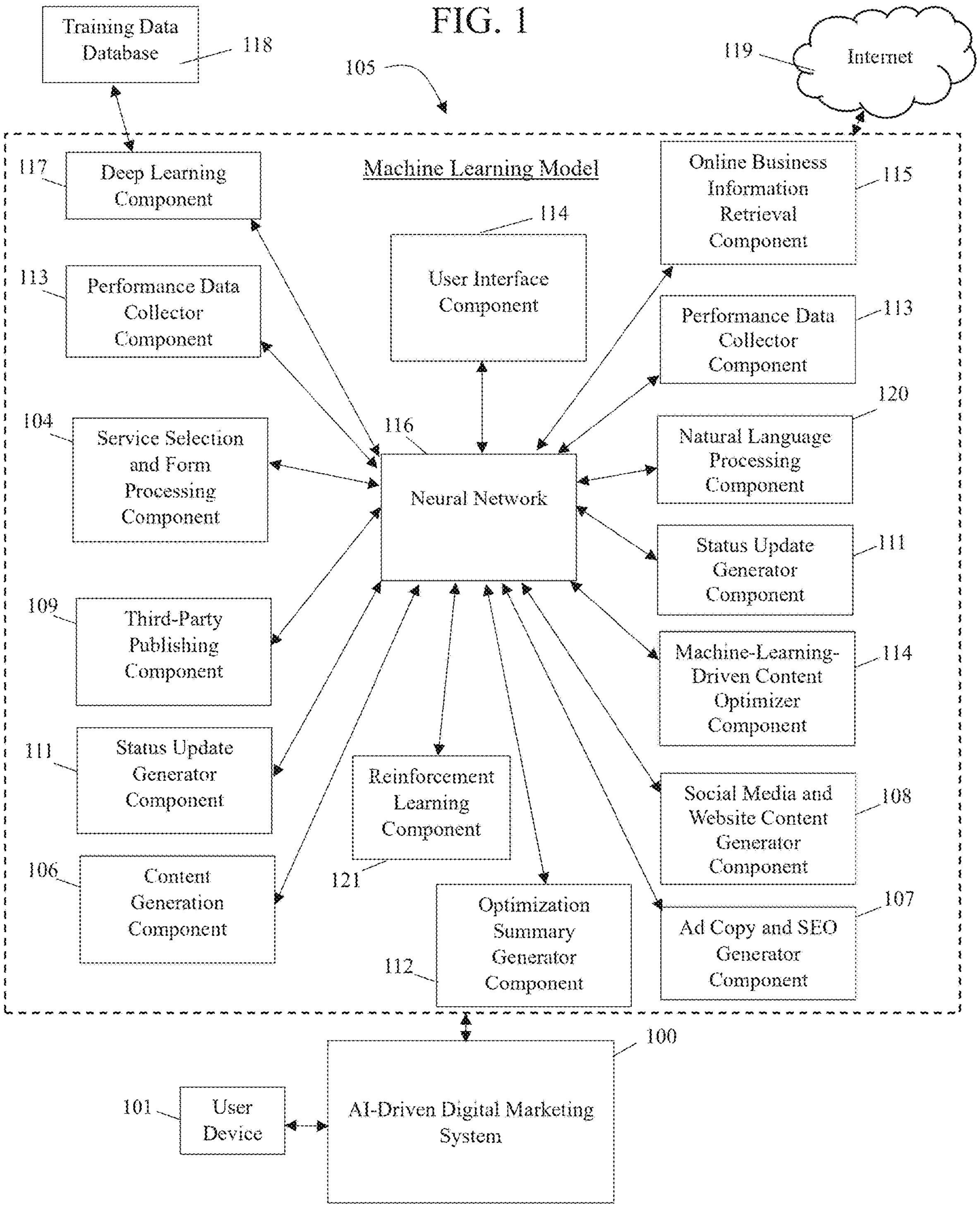
FIG. 1 is a schematic block diagram of an artificial intelligence (AI) system employable by an automated AI-driven digital marketing system, according to embodiments of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments unless the context clearly indicates otherwise.

As used herein, the singular forms "a," "an" and "the" are intended to include the plural forms as well, unless the context clearly indicates otherwise.

Exemplary configurations of the disclosure will be described more fully below (e.g., with reference to the accompanying drawings). Like reference numerals may refer to like elements throughout the specification and drawings.

Although operations may be presented in a particular order in the flowcharts or described in a sequential manner in the accompanying text, it should be understood that the order of operations is not necessarily limited to the order shown or described. Unless explicitly stated otherwise, the operations may be performed in a different order, simultaneously, or omitted entirely, depending on the implementation.

Embodiments of the present disclosure provide a fully automated, artificial intelligence (AI)-driven digital marketing system that enables users to select marketing services through a simplified user interface, dynamically configures and executes campaigns across multiple platforms, and continuously optimizes marketing strategies based on real-time data.

For example, embodiments of the present disclosure provide an AI-powered digital marketing automation platform that allows users to dynamically configure, execute, and manage digital marketing campaigns with minimal manual intervention. A user interface, which may include, for example, an adjustable selection mechanism such as a sliding lever or equivalent input, enables users to set desired marketing service levels, triggering an AI-driven workflow that executes the selected services across various third-party platforms.

The AI-driven digital marketing system may automate processes such as, for example, marketing campaign creation, ad copy generation, website development, search engine optimization (SEO) configuration, and social media posting using artificial intelligence. Additionally, the AI-driven digital marketing system may include an AI-powered command interface that enables users to modify campaigns via simple commands through, for example, email or a dashboard-based command entry interface. The AI utilized in the system may continually optimize campaigns based on, for example, engagement data, performance metrics, and learned behaviors.

By integrating a machine learning model that iteratively improves marketing decisions, embodiments of the present disclosure provide a technical improvement over existing marketing automation tools. For example, according to embodiments, the AI-driven marketing system not only automates marketing execution but also adapts dynamically, offering a practical application of AI in marketing strategy optimization.

Embodiments of the present disclosure provide a comprehensive AI-powered digital marketing automation platform designed to streamline digital advertising, social media management, SEO configuration, multimedia content creation, and customer relationship management (CRM)-based outreach, while optimizing marketing strategies in real time. The system includes several components, also referred to herein as "modules" or "engines", that work together to deliver a seamless and highly automated marketing experience for users.

According to an embodiment of the present disclosure, the AI-driven digital marketing system first presents a user with an interactive interface that allows the user to select the level of marketing services the user is interested in. This interface can take multiple forms, such as, for example, a sliding lever, a toggle, a dynamically populated questionnaire, or an AI-driven chatbot that engages users in an interactive discussion about their marketing goals. Based on user selections, the system configures a suite of digital marketing services, including but not limited to website development, paid advertising, organic SEO optimization, customer engagement strategies, and social media content distribution.

Once the user confirms their selection, the AI-driven digital marketing system may retrieve relevant business information by crawling existing digital assets including, for example, websites, social media accounts, and online business directories. This information is then processed and structured into various campaign configurations. The system may analyze the user's industry, competitors, and target audience to generate optimized content, including website text, advertising copy, keyword strategies, and social media posts. The system may employ natural language processing (NLP) techniques and generative models to confirm that all generated content aligns with industry-specific standards and user-defined preferences.

According to an embodiment, the AI model may be trained using large datasets including, for example, historical marketing performance, engagement metrics, and behavioral trends to improve predictive accuracy. The system may utilize deep learning models such as, for example, convolutional neural networks (CNNs) for image recognition in ad creatives, transformer-based models for language understanding in ad copywriting, and reinforcement learning frameworks to optimize bidding strategies dynamically.

The AI-driven digital marketing system according to embodiments may integrate real-time feedback loops by monitoring, for example, engagement metrics, click-through rates, conversion data, and competitor trends. The system may continually refine marketing campaigns, adjusting elements such as ad placements, budget allocations, audience targeting, and messaging strategies based on changing conditions in the digital advertising landscape.

According to embodiments, a cloud-based infrastructure supports the platform, providing scalability and real-time performance. Embodiments may include a plurality of AI components (e.g., modules, engines, etc.) that leverage distributed computing to process high volumes of data efficiently. The backend architecture of the AI-driven digital marketing system may include a plurality of microservices that handle campaign creation, data analytics, AI decision-making, and third-party API integrations independently, enhancing system reliability and flexibility.

Embodiments may provide a real-time command interface that allows users to modify their marketing campaigns effortlessly. Users can issue commands through, for example, email, chatbot, or dashboard text fields. The AI-driven digital marketing system may process these commands using NLP and execute the requested modifications. Commands such as, for example, "update headline on homepage," or "shift budget from FACEBOOK to GOOGLE Ads" may be interpreted and performed autonomously by the system.

An AI-generated reporting component may provide visual analytics and recommendations for optimization. Reports may be delivered in a human-readable format with, for example, plain language summaries, key performance indicators, and actionable suggestions. Advanced reports may incorporate, for example, sentiment analysis, competitor benchmarking, and forecasts based on predicted campaign trajectories.

The AI-driven digital marketing system according to embodiments can integrate with customer relationship management (CRM) platforms such as, for example, SALESFORCE, HUBSPOT, and ZOHO. The AI-driven digital marketing system may segment leads, score prospects, and automate follow-up emails. This enables the AI-driven digital marketing system to orchestrate drip campaigns and behavioral triggers, providing personalized marketing at scale.

Embodiments of the present disclosure may provide multimedia content generation capabilities. For example, according to embodiments, the AI-driven digital marketing system can automatically generate promotional videos using uploaded photos and property descriptions, complete with auto-synced narration, music, and branded animations. The AI-driven digital marketing system can also produce static graphics such as, for example, banners, infographics, and social media creatives. Visual assets may be tailored for cross-platform compatibility and may be A/B tested for effectiveness.

The AI platform provided by embodiments of the present disclosure may support advanced features such as, for example, predictive audience segmentation, channel-specific performance optimization, and automated experimentation via A/B and multivariate testing. Reinforcement learning agents may be used to identify high-performing ad combinations and to adjust variables such as, for example, headlines, color schemes, and call-to-action phrases to maximize engagement.

Embodiments of the present disclosure may utilize a training component, where the AI-driven digital marketing system can iteratively improve through feedback and retraining cycles based on success metrics. This continuous learning process may provide long-term performance gains.

FIG. 1 is a schematic block diagram of an AI system employable by an automated AI-driven digital marketing system 100 configured to provide end-to-end automation of digital marketing campaigns, according to embodiments of the present disclosure. The system 100 may leverage a machine learning model 105 and integrate with third-party platforms to execute campaigns across various channels, optimize performance based on real-time feedback, and support intelligent user interactions throughout the campaign lifecycle.

The machine learning model 105 may include a neural network 116, which is described in more detail below. As an example, the machine learning model 105 may include the neural network 116 including or configured to communicate with a deep learning component 117, as well as a plurality of other components described below.

The deep learning component 117 may access training data, such as training data stored in a training data database 118. The training data database 118 can be continuously updated with new/expanded training data. Training an AI component, such as the deep learning component 117, is described in more detail below. The components included in the machine learning model 105 may communicate with the Internet 119 to communicate data. Updated information may be captured from the Internet 119 on a constant and instantaneous or near-instantaneous basis.

The neural network 116 may refer to the architectural core of the machine learning model 105. The neural network 116 may take a set of inputs, pass the inputs through a series of hidden layers, in which each layer can transform the inputs, and then produce an output. The process of transforming the inputs is determined by the weights and biases of the neurons in the hidden layers of the neural network 116, which are learned from data during training of the neural network (see, e.g., training data database 118). The neural network 116 may include relatively simple (single layer) or relatively complex structures (multiple layers). The deep learning component 117 may employ a particular type of neural network (e.g., a Convolutional Neural Network (CNN), an artificial neural network (ANN), etc.) to process data. The neural network 116 may be a CNN or an ANN.

The deep learning component 117 may be employed by the neural network 116. The deep learning component 117 may deliver high-dimensional representations of user data to the neural network 116. The neural network 116 may then use the information from the deep learning component 117 to learn complex patterns and inform the neural network's decision-making processes. The neural network 116 may work with a natural language processing component (NLP) 120 by generating language representations that the NLP component 120 may use for understanding and generating text.

The deep learning component 117 can be employed for generating embeddings and high-dimensional representations of user data based on data inputs received from the user. The outputs from the deep learning component 117 can be employed by the other components within the machine learning model 105. Over the course of predictions and feedback, the deep learning component 117 can become more accurate.

A user may access the system 100 via a user device 101, such as, for example, a smartphone, tablet, or desktop computer. A user interface component 114 may provide a frontend interface for onboarding, service selection, campaign customization, and monitoring. The interface may include selectable controls such as, for example, a slider, lever, toggle, chatbot interaction, or form fields that dynamically adapt to the services selected by the user.

Through the interface, the user may submit marketing input including, for example, a business name, address, website, preferred marketing services (e.g., SEO, social media, paid ads), and login credentials for integrated services (e.g., GOOGLE Business, FACEBOOK Ads, etc.). This information may be entered manually or recommended via an AI-guided questionnaire. Once all required fields are completed and terms are accepted, the user may trigger progression using a confirmation mechanism (e.g., a virtual button presented to the user that the user may press for confirmation).

A service selection and form processing component 104 may interpret the user's selected services and generate a tailored onboarding experience, dynamically assembling form segments to collect additional data as needed. An online business information retrieval component 115 may crawl public sources including, for example, the user's website, listings, and social media profiles, to enrich the onboarding process and reduce or minimize manual input. The service selection and form processing component 104 and the online business information retrieval component 115 may operate simultaneously.

All collected data may be input to the machine learning model 105, which may serve as the central intelligence of the AI-driven digital marketing system 100. This machine learning model 105 may include, for example, natural language processing, generative content models, deep learning neural networks, and reinforcement learning components. The machine learning model 105 may be trained on, for example, historical campaign data, user behavior patterns, platform-specific constraints, and performance metrics to inform downstream decision-making.

The machine learning model 105 may include a plurality of components that perform different tasks. For example, a content generation component 106 may produce digital marketing assets such as, for example, website copy, social media posts, and ad creatives. The AI-driven digital marketing system 100 may generate content based on, for example, tone preferences, industry-specific language, and audience targeting goals.

An ad copy and SEO generator component 107 may tailor promotional messaging to maximize visibility and engagement on search engines and paid ad platforms. The ad copy and SEO generator component 107 may generate, for example, keyword lists, SEO metadata, geo-targeted language, and ad text conforming to platform-specific constraints (e.g., character limits, headline structures).

A social media and website content generator component 108 may generate platform-specific content optimized for, e.g., engagement, visual layout, and cross-device compatibility. For example, the social media and website content generator component 108 may generate headlines, paragraph blocks, captions, hashtags, and supporting media descriptions.

Generated assets may be transmitted to a third-party publishing component 109, which may use API integrations to configure, deploy, and manage the digital campaigns across various external services. These may include, for example, advertising platforms, listing services, CMS tools, and website hosts. The third-party publishing component 109 may have access to and interact with, for example, ad networks, social media platforms, websites, etc.

Upon campaign launch, a status update generator component 111 may notify the user with system-generated confirmations, detailing where and how assets have been deployed. An optimization summary generator component 112 may prepare a real-time performance dashboard, which the user may access using login credentials delivered via, e.g., email. The status update generator component 111 and the optimization summary generator component 112 may operate simultaneously.

As campaigns run, a performance data collector component 113 may aggregate performance metrics (e.g., impressions, click-through rate (CTR), cost per click (CPC), return on ad spend (ROAS)) from all connected third-party platforms. This data may be used to drive continual optimization.

A machine-learning-driven content optimizer component 114 may evaluate the incoming data using, for example, predictive models, reinforcement learning, and historical trend analysis. This component may adjust bids, rotate ad creatives, tune targeting parameters, and reallocate budgets in real-time to maximize marketing efficiency.

All campaign activity, user interactions, and external results may be captured within the training data database 118. This repository may support continual improvement by serving as a reference corpus for retraining and fine-tuning of the machine learning model 105.

The machine learning model 105 may further include a reinforcement learning component 121. The reinforcement learning component 121 may be configured to optimize digital marketing performance by learning from feedback signals derived from real-world campaign results. For example, the reinforcement learning component 121 may receive campaign performance data such as impressions, clicks, conversions, or engagement statistics from third-party platforms, and adjust internal decision parameters accordingly to improve asset targeting, messaging, or allocation strategies. Over time, the reinforcement learning component 121 may enhance the AI-driven digital marketing system's 100 ability to dynamically adapt marketing outputs based on observed performance outcomes, thereby enabling continuous self-improvement of the AI-driven digital marketing system 100.

The neural network 116 may support advanced AI operations such as, for example, semantic intent recognition, generative design, and behavioral segmentation. The neural network 116 may include, for example, transformer-based language models, convolutional neural networks (CNNs) for image handling, and reinforcement agents for adaptive strategy optimization.

In addition to the components and functionality described above with reference to FIG. 1, the AI-driven digital marketing system 100 may include additional components and functionality according to embodiments of the present disclosure. For example, the AI-driven digital marketing system 100 may include AI-powered multimedia generation tools for video creation, graphic design, and branded asset rendering, CRM integration components for behavior-triggered outreach and drip campaigns, voice and messaging agents for AI-driven customer engagement and appointment scheduling, and automated experimentation components supporting A/B and multivariate testing.

The AI-driven digital marketing system 100 of FIG. 1 may collectively enable a user to select desired services, submit business details, automatically launch and manage campaigns, interact with a responsive AI agent, and receive intelligent feedback, while continuously learning and adapting to improve results.

Still referring to FIG. 1, an exemplary architecture of the machine learning model 105 including the artificial neural network 116 employable by the systems and methods described herein is shown. The machine learning model 105 may be initially trained on a first data set, such as a first training data set stored in training data database 118. The machine learning model 105 may then be iteratively trained on additional training data sets (e.g., a second data set, a third data set, etc.) that are continuously added to the training data database 118 as additional training data becomes available. Thus, the machine learning model 105 can be iteratively trained and the resulting functionality and prediction accuracy of the machine learning model 105 itself may be iteratively improved.

For example, the machine learning model 105 may be initially trained on a first data set to predict which digital marketing service tier (e.g., entry-level ad copywriting, SEO optimization, social media management) should be activated based on a user's graphical selector input. The machine learning model 105 may be initially trained on the first data set to identify patterns in user behavior and business type to suggest optimal service combinations. Subsequently, the machine learning model 105 may be iteratively trained on additional data sets collected from real-world usage of the AI-driven digital marketing system 100, thereby improving the recommendation and automation accuracy over time. This has the practical application of enhancing the functionality of the marketing platform while improving the underlying technology for scalable, automated digital marketing customization.

As described above, the neural network 116 may be an artificial neural network (ANN). Training the ANN 116 to control aspects of digital marketing automation may involve an iterative process where the ANN 116 learns to adjust system parameters to automatically generate relevant content, optimize delivery timing, and reduce the need for manual oversight. The ANN 116 may be trained to balance automation accuracy with user engagement metrics and campaign effectiveness, thereby improving overall marketing outcomes. An iterative training process according to embodiments of the present disclosure will now be described in further detail.

Data collection may involve aggregating diverse data sets that reflect various user preferences, business types, engagement metrics, conversion rates, industry benchmarks, third-party platform data, and natural language inputs. Input data may include, e.g., form selections, website URLs, product types, user-entered commands, and historical marketing performance. Outputs may include, e.g., generated ad copy, SEO recommendations, campaign schedules, and media assets.

An exemplary ANN architecture may include input layers to accept user, business, and performance data; hidden layers to capture relationships between service tiers, content types, and campaign outcomes; and an output layer to generate digital marketing actions. The initial ANN architecture may employ randomly initialized weights and biases.

Training data preparation may include, e.g., splitting historical campaign data and user inputs into a training set (to teach the ANN 116), a validation set (to evaluate performance of the outputs), and a testing set (to assess generalizability to new use cases).

Defining the training process may include establishing one or more error metrics (e.g., click-through rate deviation, ad engagement error, SEO score deltas). Optimization algorithms such as, for example, Gradient Descent, Adam, or RMSProp may be used to minimize or reduce these errors by adjusting model weights. A learning rate determines how significantly weights are adjusted per iteration.

Iterative training may include a forward pass, where for each data point in the training set, the model predicts a marketing output (e.g., a content type or service configuration). A loss calculation may be performed comparing the predicted output with the actual high-performing campaign or selected service. During the backward pass, gradients may be calculated and weights updated based on those gradients and the learning rate. The training may be repeated across epochs until model performance stabilizes or reaches a target improvement.

A reinforcement learning operation may be incorporated in which the ANN 116 acts as a policy for selecting service recommendations and content generation strategies. The environment may return a reward based on downstream metrics (e.g., lead generation, conversions), and the ANN 116 may be updated to improve or maximize cumulative performance.

Validation and fine-tuning may include evaluating the ANN 116 against new or unseen client data, and adjusting hyperparameters such as, e.g., neuron count, depth, or architecture style. This may provide robust generalization across industries and business sizes.

Real-world testing may involve, e.g., deploying the trained ANN 116 in production within the AI-driven digital marketing system 100, monitoring campaign results, user interaction quality, and system responsiveness. System telemetry may be used to further refine training.

Continuous learning may include, for example, collecting updated user interaction data, evolving market trends, and feedback from campaigns, and periodically retraining the ANN 116 to provide adaptation to platform changes, seasonal demand cycles, or emerging content formats.

This iterative training process may improve the predictive power and content generation ability of the ANN 116 while also improving the underlying technology of automated digital marketing customization. By learning from past marketing campaigns and real-time interaction data, the AI-driven digital marketing system 100 can dynamically optimize campaign strategy with minimal human intervention.

FIGS. 2A, 2B, and 3-10 are flowcharts illustrating various aspects of the AI-driven digital marketing system 100 provided by embodiments of the present disclosure. Embodiments in accordance with FIGS. 2A, 2B, and 3-10 provide a system that enables a user to select desired marketing services-either manually or by responding to a guided set of questions that yield an AI-based recommendation. Once services are selected, the user may submit the basic information necessary to fulfill the order, such as, for example, business name, contact details, and marketing preferences. From there, the AI-driven digital marketing system 100 may leverage artificial intelligence and integrate with third-party marketing platforms to, for example, autonomously generate campaign components, execute deliverables, and continuously refine campaign performance through machine learning techniques. The AI-driven digital marketing system 100 provided according to embodiments may further monitor results, generates intuitive reports, and support two-way communication with the user, enabling real-time adjustments to campaigns or content through natural-language interaction. FIGS. 2A, 2B, and 3-10, described below, collectively illustrate the end-to-end lifecycle of this automated process, from onboarding to optimization, according to embodiments of the present disclosure.

Figure 2A:
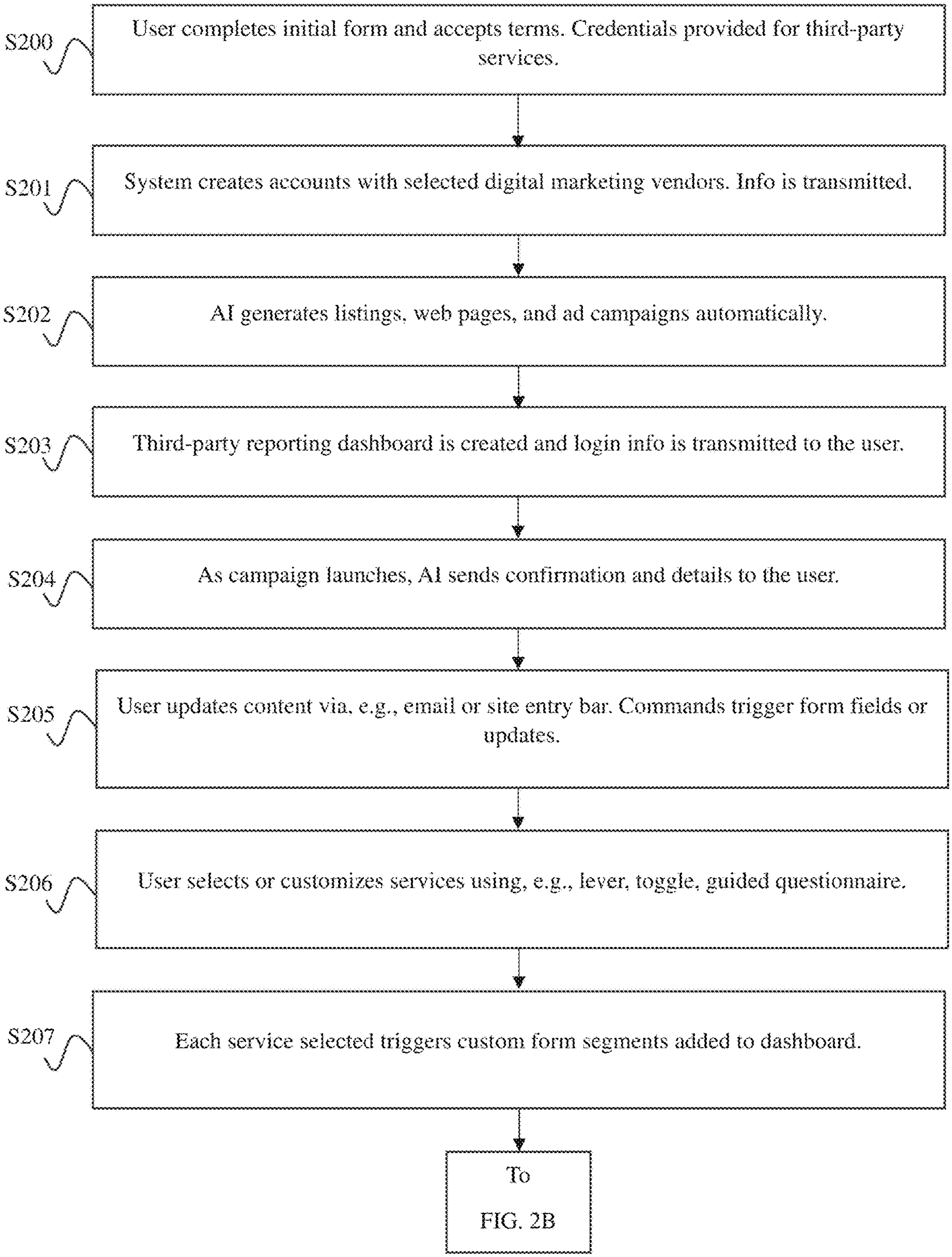
FIGS. 2A-2B are flowcharts illustrating an end-to-end overview of the AI-driven digital marketing system, according to embodiments of the present disclosure.
Figure 2B:
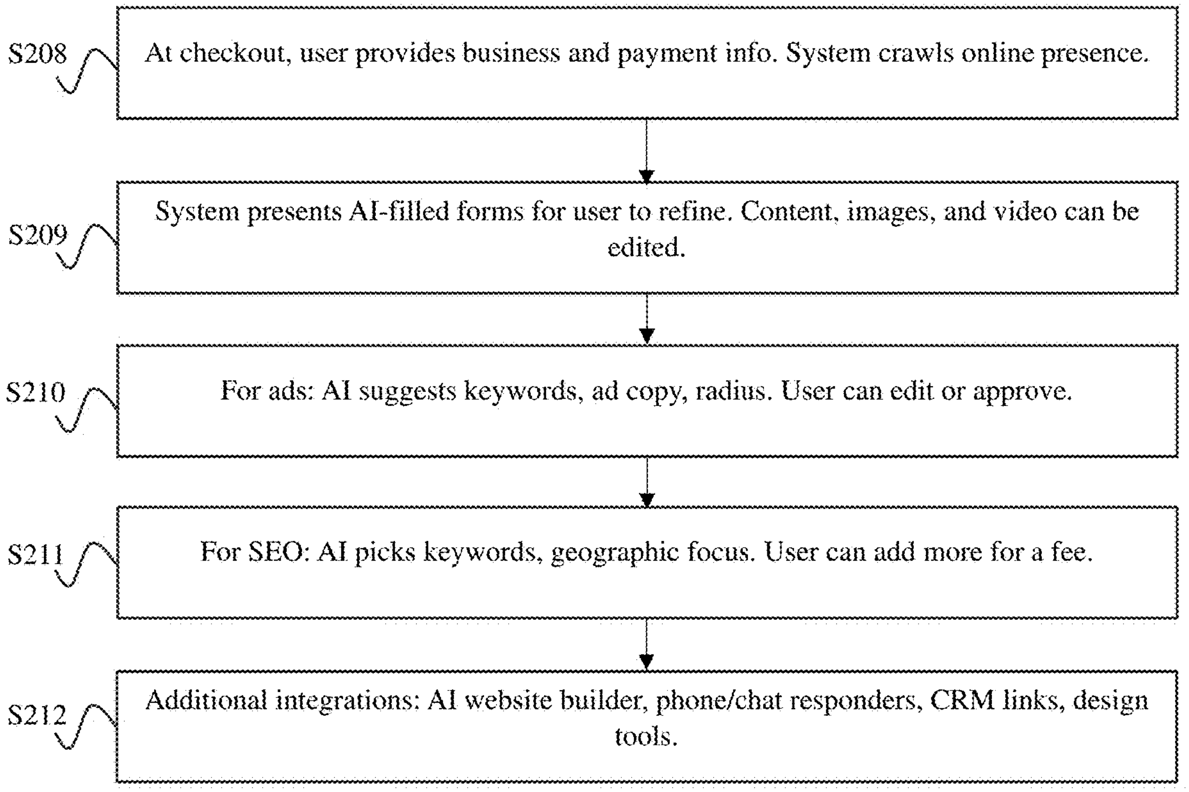

FIGS. 2A-2B are flowcharts illustrating an end-to-end overview of the AI-driven digital marketing system 100, from user input and onboarding to campaign automation and ongoing optimization, according to embodiments of the present disclosure.

Referring to FIGS. 2A-2B, in operation S200, the process begins when the user, via the user device 101, completes the initial onboarding form via the user interface component 114 and agrees to the platform's terms and conditions. As part of this operation, the user may also grant access credentials to third-party platforms such as GOOGLE or social media networks for marketing integration.

Onboarding may refer to the process by which the AI-driven digital marketing system 100 collects, prepares, and transmits initial data necessary to configure and activate one or more selected marketing services. This process may include, for example, gathering business information from the user via the graphical user interface, retrieving supplemental data from online sources or third-party platforms, generating service-specific form fields, and producing onboarding data that is transmitted to one or more third-party digital platforms for service activation (e.g., to log into and access the third-party digital platform). For example, the onboarding process may include receiving login credentials or authentication tokens from the user for integration with relevant third-party platforms (e.g., social media accounts, search engine business profiles, etc.), and establishing secure connections with these platforms to facilitate automated setup, configuration, and management of the selected marketing services.

In operation S201, after form submission, the system may create or configure accounts with the selected digital marketing third-party platforms (also referred to as "vendors"). Information gathered from the user's form may be automatically transmitted to these vendors through API integrations.

In operation S202, using the content generation component 106 and the ad copy and SEO generator component 107 of the AI-driven digital marketing system 100, the platform may build marketing deliverables including, for example, business listings, websites, and digital advertisements. These assets may be tailored based on user input and publicly available business information.

In operation S203, the system may set up a centralized third-party reporting dashboard, which consolidates campaign performance metrics from various platforms. The user may receive login credentials to access this dashboard and monitor ongoing marketing activity.

In operation S204, as each campaign launches, the system may send an AI-generated message or email to the user confirming that the service has been activated. The message includes campaign details such as, for example, keywords, platforms used, or geographic targets.

In operation S205, the user may issue updates to live campaigns or content by replying to system-generated emails or by submitting inputs through a dashboard feature. For example, the dashboard may provide the user with a “Changes Entry Bar” allowing the user to issue updates such as, for example, “add this photo to my website” or “change my hours to Monday through Friday, 10:00 am to 6:00 μm.” These instructions may be parsed by natural language processing tools.

In operation S206, certain user commands may trigger the appearance of additional form fields or interfaces prompting the user to upload attachments or provide more specific details (e.g., the photo being added to the user's website as discussed above with reference to operation S205). The platform may dynamically update its interface to accommodate these needs.

In operation S207, the AI-driven digital marketing system 100 may apply the requested changes to the active campaigns or content using the third-party publishing component 109 and communicate these updates to the relevant third-party providers through integrated APIs. These updates may be coordinated via the third-party publishing component 109, which may transmit revised content to platforms such as social media networks or advertising services.

In operation S208, the user can select specific marketing services using, for example, a slider interface or similar configuration tool presented by the user interface component 114. Alternatively, the machine learning model 105 may offer recommendations based on an AI-driven questionnaire processed through the NLP component 120 and the neural network 116.

In operation S209, each selected service may trigger the addition of related data entry segments on the user's dashboard, presented via the user interface component 114. These service-specific form fields may be generated dynamically by the service selection and form processing component 104 to collect necessary details relevant to each service type (e.g., social media ads, SEO).

In operation S210, upon checkout, the user may provide key business information such as, for example, company name, address, website URL, and payment credentials, through a form rendered by the user interface component 114, which communicates with the service selection and form processing component 104 to validate and store the user input. Once submitted, the user may click a confirmation button (e.g., a virtual button presented to the user that the user may click/press for confirmation).

In operation S211, after the purchase is confirmed, the online business information retrieval component 115 may crawl publicly available business data and auto-fill many of the form fields on the user's dashboard. The retrieved data may be further processed by the machine learning model 105 to assist with campaign configuration. The user can then review, refine, or replace the suggested content, images, and videos using built-in AI assistance tools.

In operation S212, depending on the services selected, the content generation component 106, the ad copy and SEO generator component 107, and the social media and website content generator component 108 may work together to generate, e.g., ad copy, keywords, SEO metadata, and social content. These components operate within the machine learning model 105 as described above, and may rely on representations produced by the deep learning component 117 and the neural network 116. For SEO services, a primary keyword and geographic focus may be auto-selected, with options for user customization or upsells for additional targeting zones. The platform may support numerous bolt-on features such as, for example, AI-driven website builders, CRM-triggered automation (e.g., review requests), virtual receptionist systems, and AI-generated print marketing assets.

Figure 3:
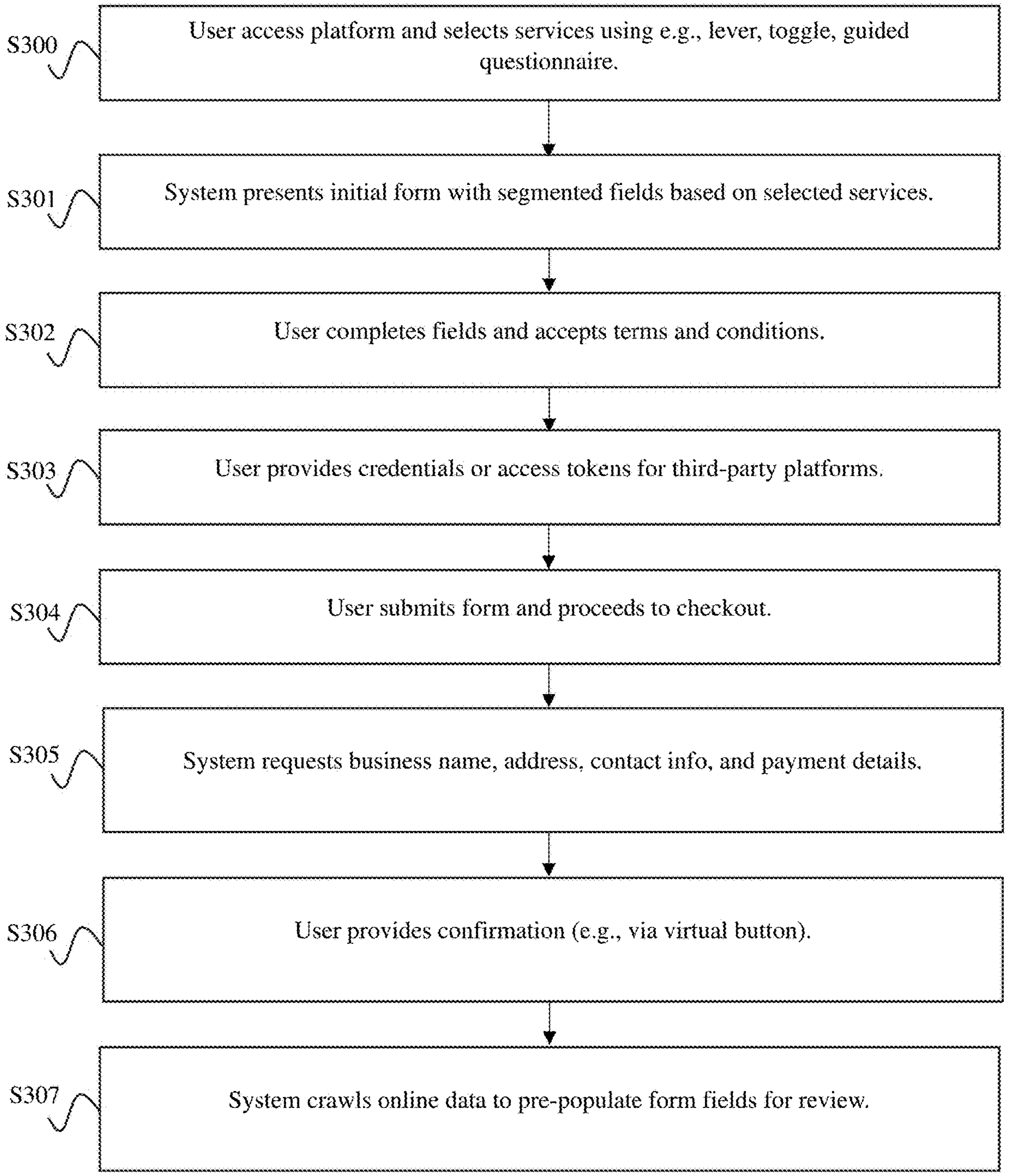
FIG. 3 is a flowchart illustrating onboarding and service selection of the AI-driven digital marketing system workflow, according to embodiments of the present disclosure.

FIG. 3 is a flowchart illustrating onboarding and service selection of the AI-driven digital marketing system workflow, showing how a user interacts with the interface, completes initial forms, and initiates AI-driven configuration, according to embodiments of the present disclosure. The operations illustrated in FIG. 3 may correspond to a first phase in which onboarding and service selection are performed.

Referring to FIG. 3, in operation S300, the process begins when a user accesses the platform interface via the user device 101 and selects one or more marketing services through the user interface component 114. This selection can be made using an interactive control within the user interface component 114, such as, for example, a sliding lever, toggle, or guided question-and-answer flow designed to identify the user's objectives and preferred service tier.

In operation S301, once the desired services are selected, the service selection and form processing component 104 may dynamically generate an onboarding form. This form may include segmented fields that are tailored to the services chosen by the user. Each segment may collect specific data relevant to configuring those services.

In operation S302, the user may proceed to fill out the onboarding form by providing the requested information via the user interface component 114. Before submission, the user may review and agree to the terms and conditions of the service.

In operation S303, if the selected services require integration with third-party platforms (e.g., GOOGLE Business Profile, FACEBOOK Ads, etc.), the user is prompted to grant necessary access permissions or provide authentication credentials through the user interface component 114.

In operation S304, after required fields are completed and permissions granted, the user may click a submission control (e.g., a “Next” or “Continue” button) rendered by the user interface component 114 to move toward order finalization and checkout.

In operation S305, at this point, the system presents a billing form through the user interface component 114 that requests business details. This may include, for example, the business name, physical address, phone number, website URL, and billing or credit card information for payment processing.

In operation S306, to confirm the service order, the user activates a submission control, for example, a virtual button presented via the user interface component 114 that the user may click/press for confirmation, which serves as the final commitment action to proceed with the selected services.

In operation S307, following confirmation, the online business information retrieval component 115 may perform a real-time data crawl using publicly available online sources to supplement the information provided by the user. This data may be used to pre-fill relevant form fields and reduce the user's manual input burden during subsequent steps.

Figure 4:
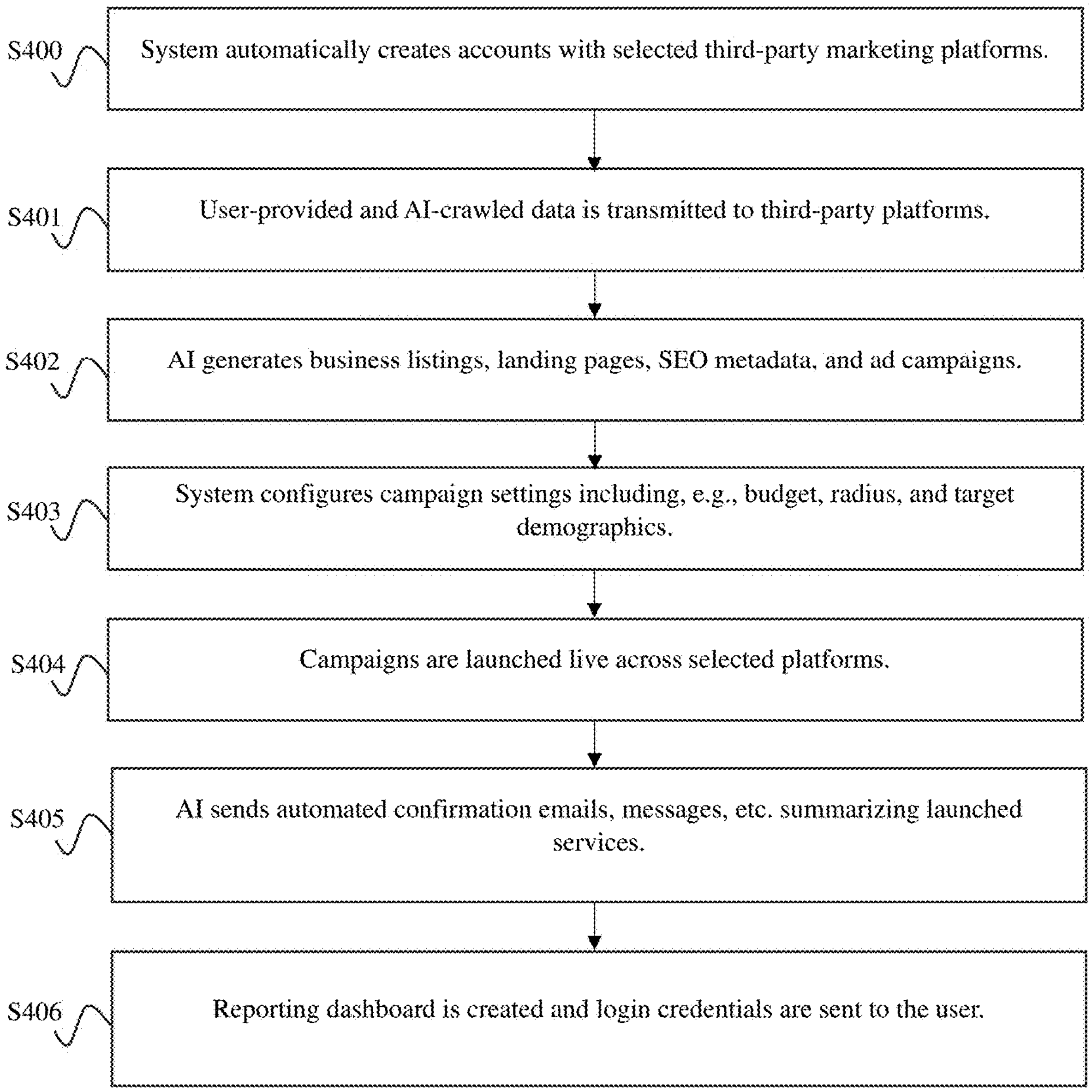
FIG. 4 is a flowchart illustrating campaign execution and AI automation of the AI-driven digital marketing system workflow, according to embodiments of the present disclosure.

FIG. 4 is a flowchart illustrating campaign execution and AI automation, showing how the AI-driven digital marketing system automatically deploys and manages marketing campaigns across third-party platforms, according to embodiments of the present disclosure. The operations illustrated in FIG. 4 may correspond to a second phase in which campaign execution and AI automation are performed.

Referring to FIG. 4, in operation S400, once the order is confirmed, the third-party publishing component 109 may automatically initiate the creation or configuration of accounts on the selected third-party digital marketing platforms. These platforms may include, for example, GOOGLE Ads, FACEBOOK Ads, YELP, INSTAGRAM, and other vendor-specific advertising or directory services.

In operation S401, information provided by the user—along with supplemental data obtained during the data crawling phase by the online business information retrieval component 115—may be formatted and transmitted to these third-party platforms through API-based integrations handled by the third-party publishing component 109. The AI-driven digital marketing system may correctly map and validate all fields prior to submission.

In operation S402, the content generation component 106, the ad copy and SEO generator component 107, and the social media and website generator component 108 may use AI-powered engines to create various marketing assets. This may include, for example, online listings, landing pages, ad creatives, headlines, keyword lists, call-to-action text, and website metadata. The content may be customized based on, for example, the user's business type, geographic location, and service selections.

In operation S403, the machine-learning-driven content optimizer component 114 may configure the operational parameters for each campaign. These parameters may include, for example, targeting radius, demographic filters, daily or monthly budget limits, ad scheduling preferences, platform-specific rules, and performance goals. The optimizer component 114 may utilize predictive modeling to identify optimal configurations based on, for example, the business category, marketing/campaign objectives, and historical data.

In operation S404, with campaign content and settings finalized, the third-party publishing component 109 may automatically deploy the campaigns to the designated platforms. For example, ads may go live on GOOGLE, listings may be published on YELP or BING Places, and landing pages may be hosted or embedded in the user's existing website.

In operation S405, after deployment, the status update generator component 111 may send an AI-generated confirmation message to the user via, for example, the user interface component 114 or email. This message may be delivered via, for example, email, SMS, or dashboard notification and may include a summary of what was launched, along with links to preview or approve individual assets.

In operation S406, the optimization summary generator component 112 may provision a unified reporting dashboard that aggregates performance metrics from all active platforms. The dashboard login credentials-including, for example, a username and a temporary password—may be sent to the user, enabling real-time monitoring and control of the campaigns. Operations S405 and S406 may be performed simultaneously.

Figure 5:
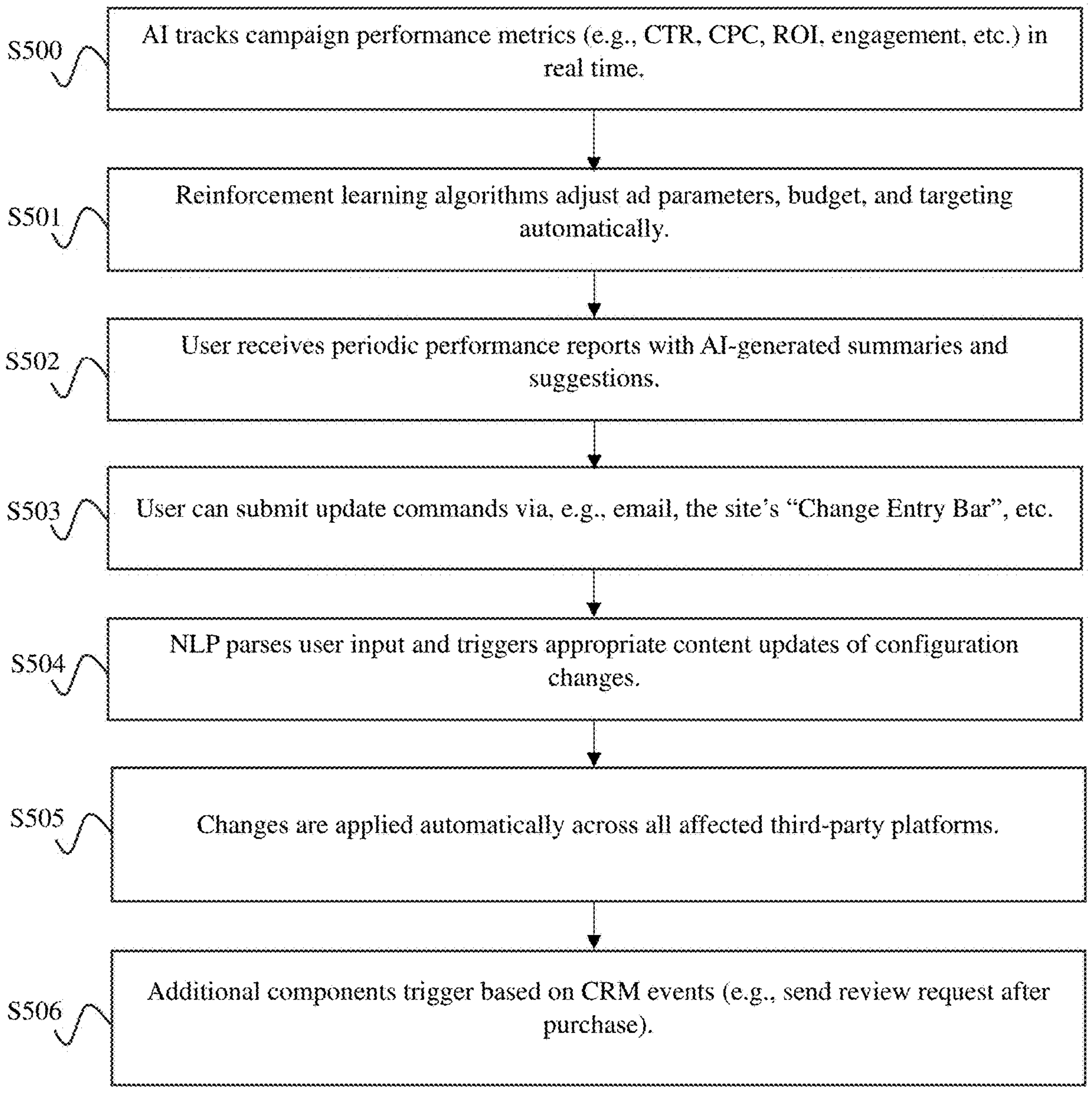
FIG. 5 is a flowchart illustrating optimization, updates, and reporting operations of the AI-driven digital marketing system workflow, according to embodiments of the present disclosure.

FIG. 5 is a flowchart illustrating optimization, updates, and reporting, showing how the AI-driven digital marketing system continuously adjusts campaigns, handles user commands, and integrates performance feedback, according to embodiments of the present disclosure. The operations illustrated in FIG. 5 may correspond to a third phase in which optimization, updates, and reporting are performed.

Referring to FIG. 5, in operation S500, after campaigns are deployed via the third-party publishing component 109, the performance data collector component 113 may continuously collect and monitor key performance metrics in real time. These metrics may include, for example, click-through rates (CTR), impressions, cost-per-click (CPC), return on investment (ROI), and user engagement statistics pulled from integrated third-party platforms.

In operation S501, the AI-driven digital marketing system 100—powered by the machine learning model 105 and informed by data collected via the performance data collector component 113—may apply reinforcement learning algorithms and data-driven decision models to optimize the marketing campaigns dynamically. Based on observed performance trends, the machine-learning-driven content optimizer component 114 may, for example, adjust bids, rotate creatives, modify target keywords, or reallocate budgets across platforms to increase campaign effectiveness.

In operation S502, on a periodic basis (or upon detecting specific performance events), the AI-driven digital marketing system 100 may generate automated reports and summaries using the optimization summary generator component 112. These reports may use natural language generation (NLG) to explain results in plain language and may include, for example, charts, insights, and suggested actions.

In operation S503, the user may receive performance updates through, for example, email, dashboard alerts, or SMS. These updates may be prepared and distributed by the status update generator component 111. If a user wishes to make changes, they may respond directly to the communication or utilize the user interface component 114 (e.g., a "Changes Entry Bar" on the dashboard interface) to issue update instructions.

In operation S504, once the AI-driven digital marketing system 100 receives a user command, the NLP component 120 may parse the instruction, extract intent, and identify the appropriate update type (e.g., change hours, add image, update headline). The parsed data may then be processed by the deep learning component 117 and other components of the machine learning model 105 to determine the optimal course of action.

In operation S505, the AI-driven digital marketing system 100 may prompt the user to upload attachments or complete related form fields if additional data is needed to complete the requested update. For example, if the user types "Add this photo to my homepage," the system may initiate an upload interface or ask the user to confirm placement details using dynamic forms generated by the service selection and form processing component 104.

In operation S506, after collecting all necessary input, the AI-driven digital marketing system 100 may execute the requested changes. The requested updates may be processed by the content generation component 106, the ad copy and SEO generator component 107, or the social media and website content generator component 108, depending on the type of content being modified. These changes may then be communicated to the relevant third-party platforms via the third-party publishing component 109. Updated campaigns, listings, or website content may then be published automatically, resulting in minimal delay and no need for manual coordination.

Figure 6:
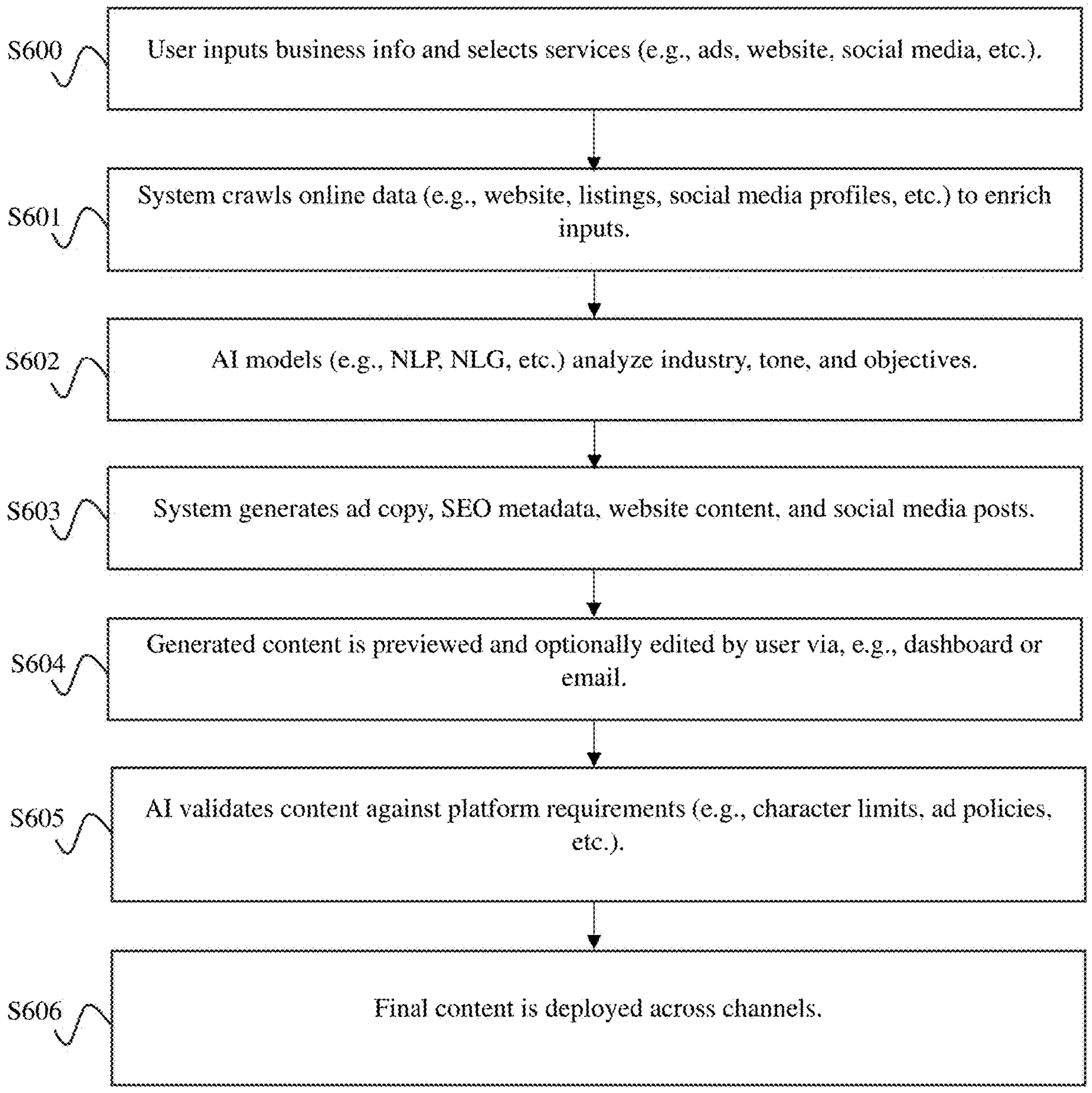
FIG. 6 is a flowchart illustrating AI-driven content generation of the AI-driven digital marketing system workflow, according to embodiments of the present disclosure.

FIG. 6 is a flowchart illustrating AI-driven content generation, showing how AI models may create content such as, for example, ad copy, SEO metadata, and website text based on user input and online data, according to embodiments of the present disclosure.

Referring to FIG. 6, in operation S600, the user may provide input through the onboarding form or service selection interface provided by the user interface component 114. This input may include, for example, business information, service preferences, desired marketing channels (e.g., website, paid search, social media), and additional uploaded media such as images or videos.

In operation S601, to improve the input data and reduce user effort, the online business information retrieval component 115 may perform an online data crawl. This crawl may include, for example, scraping information from the user's existing website, business listings, reviews, social media profiles, or other publicly available online sources. The retrieved data may be used to enhance the AI-driven digital marketing system's 100 understanding of the business.

In operation S602, the machine learning model 105, including the NLP component 120 and the deep learning component 117, may analyze the collected data. The machine learning model 105 may identify key factors such as, for example, tone of voice, target audience, product or service types, geographic relevance, and common industry terminology.

In operation S603, based on the above analysis, the AI-driven digital marketing system 100 may generate a range of marketing content using the content generation component 106, the ad copy and SEO generator component 107, and the social media and website content generator component 108. This may include, for example, ad copy tailored for platforms like GOOGLE or FACEBOOK, SEO metadata such as, e.g., page titles and descriptions, website headlines and paragraph text, and social media captions or hashtags. The content may be optimized both for human readability and platform-specific performance.

In operation S604, the generated content may be presented to the user for review through the user interface component 114. This may occur through the dashboard or via preview links shared by email. Users can additionally edit the content, accept it as-is, or request alternatives using natural language prompts (e.g., "Make it more formal" or "Add urgency") processed by the NLP component 120.

In operation S605, before final deployment, the content may be validated for compliance with platform rules and technical constraints by the third-party publishing component 109. For example, ad copy may be checked against character limits, disallowed terms, and formatting guidelines. SEO descriptions may be tailored to match best practices (e.g., best practices for a search engine such as GOOGLE).

In operation S606, the final, validated content may be deployed across the appropriate marketing channels via the third-party publishing component 109. For example, ad text may be uploaded to ad platforms, landing pages may be populated with AI-written content, and social media posts may be scheduled or published, resulting in consistent messaging and rapid execution.

Figure 7:
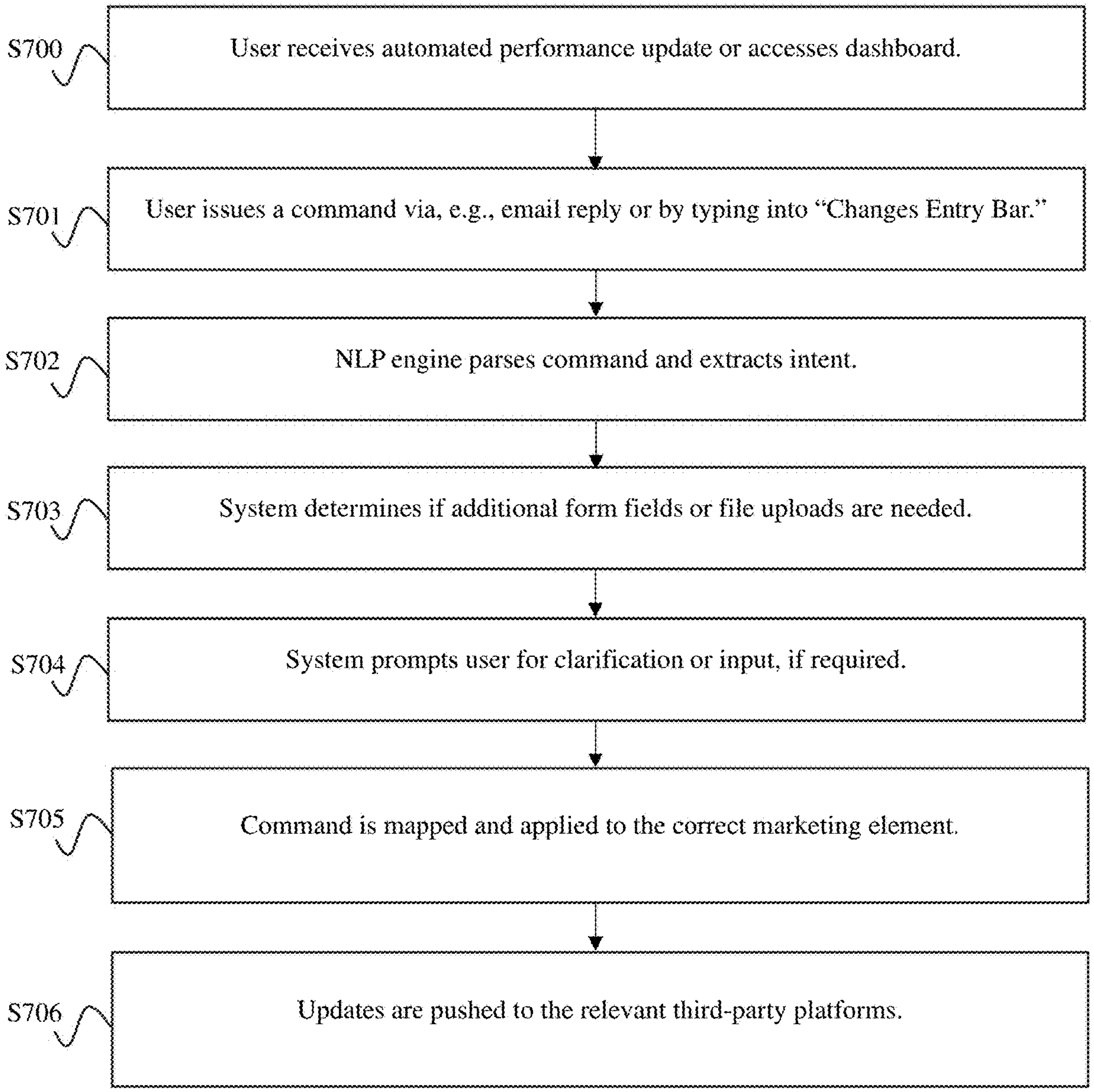
FIG. 7 is a flowchart illustrating a user command interface of the AI-driven digital marketing system workflow, according to embodiments of the present disclosure.

FIG. 7 is a flowchart illustrating a user command interface according to the AI-driven digital marketing system 100 workflow, showing how users can send natural-language instructions via email or the AI-driven digital marketing system's dashboard to modify live campaigns, according to embodiments of the present disclosure. The interface for receiving such instructions may be provided by the user interface component 114, and the natural-language interpretation of the instructions may be handled by the NLP component 120 of the machine learning model 105.

Referring to FIG. 7, in operation S700, the user may receive an automated campaign performance update—e.g., either through email, SMS, or platform dashboard notification-generated by the status update generator component 111. Alternatively, the user may access the performance dashboard generated by the optimization summary generator component 112 via the user interface component 114. This communication may include, for example, summaries, metrics, or recommended next steps.

In operation S701, if the user wishes to update or modify campaign elements, they may do so, for example, (1) by replying to the email with natural-language instructions (e.g., "Change my hours to 10-6") or (2) by entering commands using the platform dashboard (e.g., by using a "Changes Entry Bar" feature provided by the user interface component 114), which allows typed input similar to a chat window or command console. These commands are then passed to the NLP component 120 for interpretation.

In operation S702, the NLP component 120 may parse the user's natural-language input, identify the user's intent, extract any actionable elements (e.g., new operating hours, image upload request), and determine the appropriate category of the requested change. The output of the NLP component 120 may then be passed to the appropriate content generation components, such as the content generation component 106, the ad copy and SEO generator component 107, or the social media and website content generator component 108.

In operation S703, if the request requires additional data-such as, e.g., an image, video, or clarification—the user interface component 114 may generate a contextual prompt. This prompt may appear as a follow-up question ("Which page should we add the image to?") or as a dynamic interface element, such as, e.g., a file upload button or a dropdown menu with predefined options.

In operation S704, upon receiving the user's follow-up input or upload through the user interface component 114, the service selection and form processing component 104 may verify that all required information is present. The request may then be automatically mapped to the appropriate component of the machine learning model 105 and routed to the correct content or publishing component.

In operation S705, the requested update may be executed using one or more of the content generation component 106, the ad copy and SEO generator component 107, or the social media and website content generator component 108, depending on the nature of the update. Once generated or updated, the content may be published via the third-party publishing component 109 to the relevant third-party platform (e.g., social media site, website host, advertising network). The update may be processed in real time and communicated via API to the corresponding third-party provider if applicable.

In operation S706, once the update is complete, the status update generator component 111 may confirm completion by sending a status notification back to the user. This notification may be delivered via, e.g., email, SMS, or a dashboard alert generated through the user interface component 114. Depending on publishing constraints of the third-party platform, the update may take effect immediately or be scheduled for the next campaign cycle.

Figure 8:
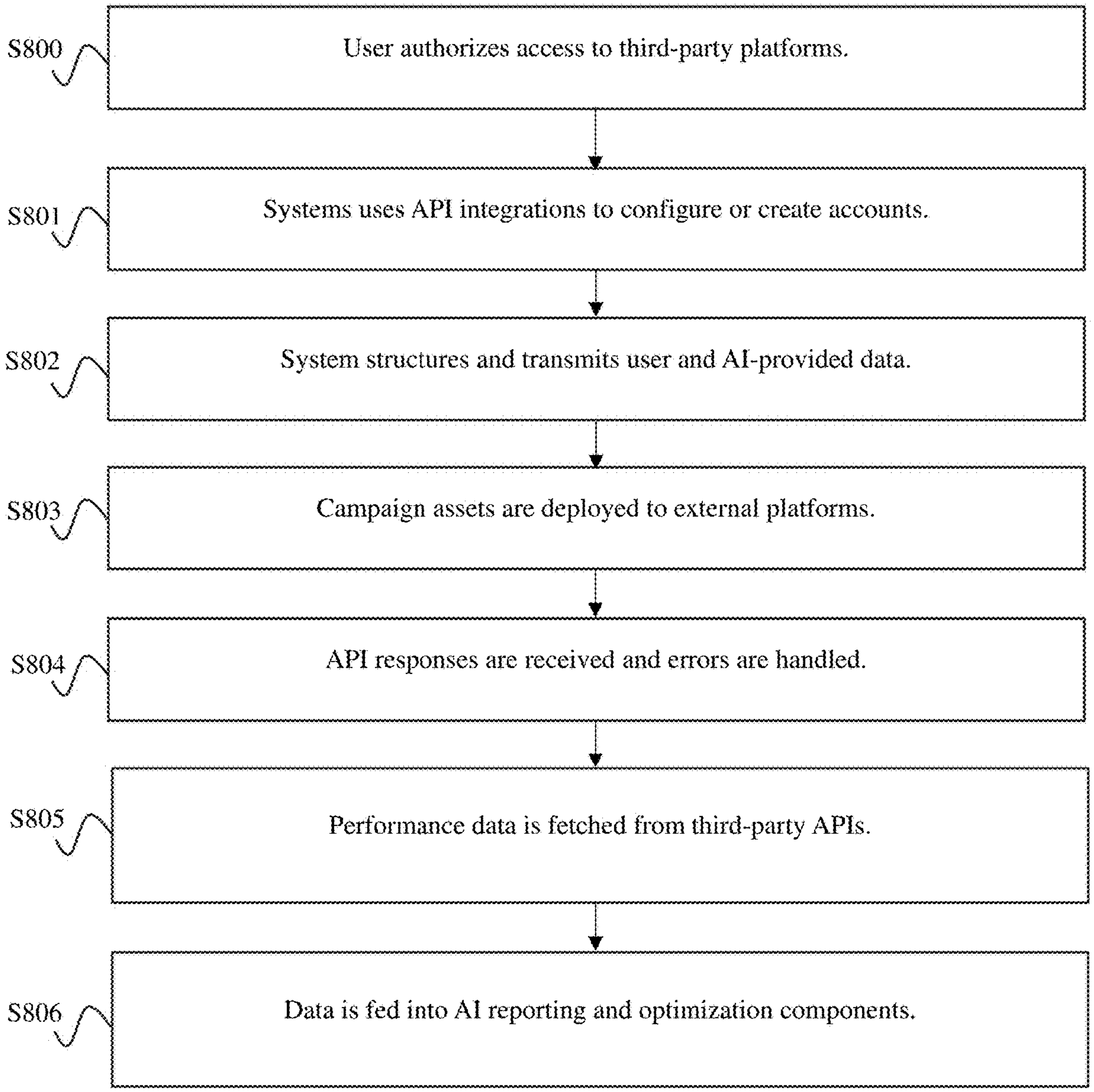
FIG. 8 is a flowchart illustrating third-party platform integration of the AI-driven digital marketing system workflow, according to embodiments of the present disclosure.

FIG. 8 is a flowchart illustrating third-party platform integration, showing how API connections are used to deploy and manage content across external marketing platforms, according to embodiments of the present disclosure. The integration operations described with reference to FIG. 8 may be handled primarily by the third-party publishing component 109 of the AI-driven digital marketing system 100, in communication with other components of the machine learning model 105.

Referring to FIG. 8, in operation S800, to enable seamless automation of marketing tasks, the user may first authorize the platform-via the user interface component 114—to access relevant third-party services. This operation may include providing, for example, credentials, generating secure API tokens, or granting OAuth permissions for platforms such as GOOGLE, FACEBOOK, INSTAGRAM, YELP, or TIKTOK.

In operation S801, once authorization is granted, the third-party publishing component 109 may use these API integrations to automatically create new accounts (if needed) or to configure existing accounts on the supported external third-party platforms. This may reduce the need for the user to manually manage third-party setup.

In operation S802, user-provided data, along with AI-enriched data from the online business information retrieval component 115 and the machine learning model 105 (e.g., via the deep learning component 117), may be organized and formatted for compatibility with each third-party platform's API structure. This may include data such as, for example, business descriptions, images, ad headlines, and targeting criteria.

In operation S803, the third-party publishing component 109 may transmit the campaign elements-including creatives generated by the content generation component 106, SEO and ad text from the ad copy and SEO generator component 107, and visual assets from the social media and website content generator component 108—to the external platforms. The AI-driven digital marketing system 100 may support multiple channels simultaneously through these API-based deployment. Ads may be launched, listings may be updated, and/or profiles may be optimized based on the input.

In operation S804, as each API request is processed, the third-party publishing component 109 may receive confirmation messages or error codes from the third-party platforms. Any exceptions or issues (e.g., policy violations, format mismatches, or rejected content) may be automatically handled by the service selection and form processing component 104 or escalated via the user interface component 114 for user resolution.

In operation S805, once campaigns or listings are live, the performance data collector component 113 may begin pulling performance data from the external platforms at regular intervals. These data streams may include, e.g., impressions, clicks, costs, and engagement metrics related to each deployed asset.

In operation S806, the retrieved data may be funneled into the machine learning model 105 and evaluated by the machine-learning-driven content optimizer component 110. Based on this data, the AI-driven digital marketing system 100 may adaptively optimize future campaigns using reinforcement learning techniques supported by the neural network 116 and deep learning component 117. This tight feedback loop may allow for marketing decisions to remain data-driven and for performance enhancements to be applied across integrated channels.

Figure 9:
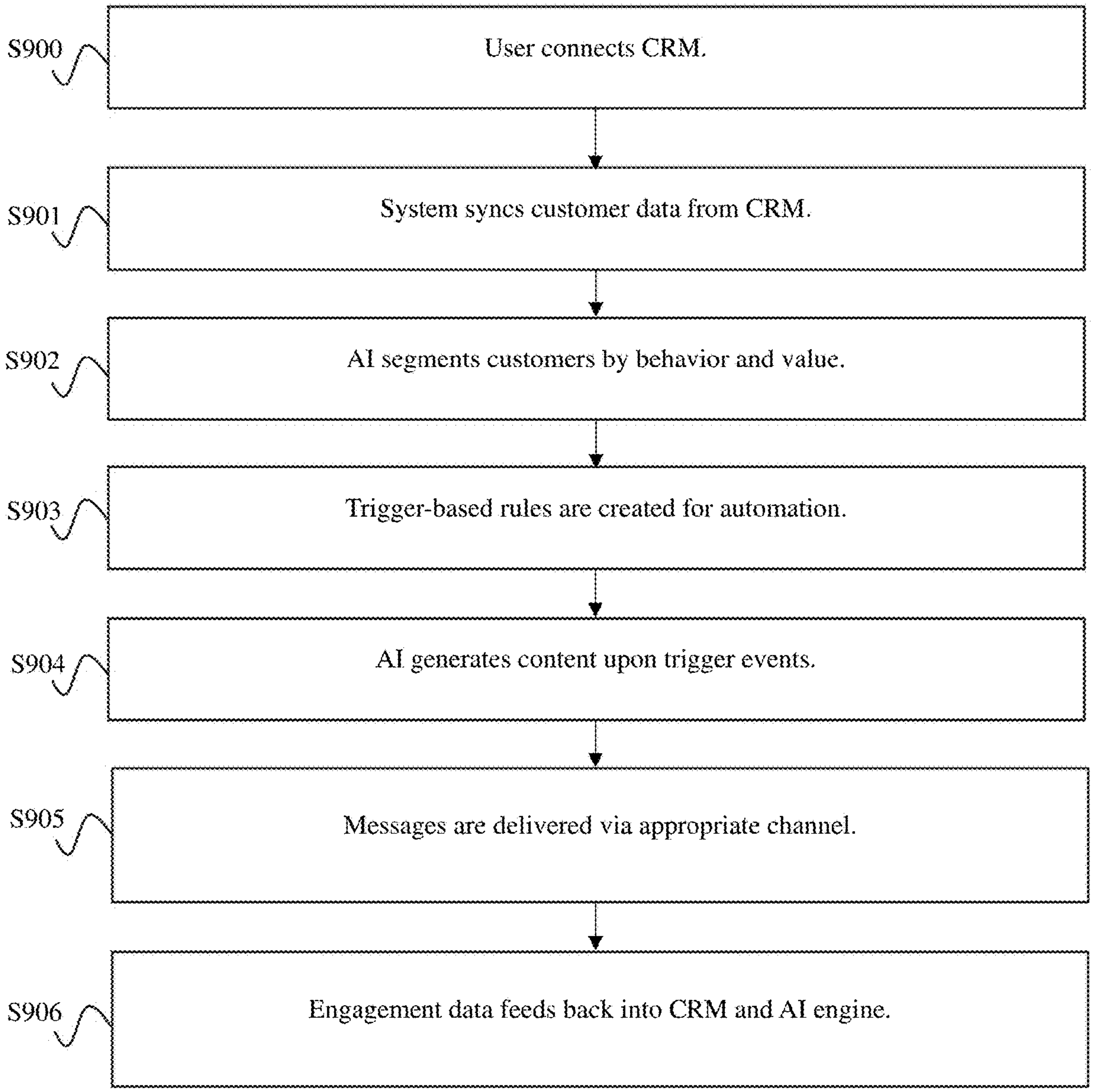
FIG. 9 is a flowchart illustrating customer relationship management (CRM) integration and automation of the AI-driven digital marketing system workflow, according to embodiments of the present disclosure.

FIG. 9 is a flowchart illustrating CRM integration and automation, showing how the AI-driven digital marketing system leverages CRM data to trigger marketing actions and personalize messaging, according to embodiments of the present disclosure. The operations described with reference to FIG. 9 may be performed by components such as the machine learning model 105, the content generation component 106, and the third-party publishing component 109.

Referring to FIG. 9, in operation S900, the user connects their existing CRM system to the platform using the user interface component 114. Supported CRM systems may include, for example, SALESFORCE, HUBSPOT, ZOHO, or other popular solutions. The integration may be facilitated via a secure API connection, enabling the platform to access CRM data with the user's authorization.

In operation S901, once integrated, the online business information retrieval component 115 sync customer records from the CRM system. This may include importing data such as, for example, contact names, phone numbers, email addresses, purchase history, engagement timelines, and other relevant behavioral metrics stored in the CRM.

In operation S902, the machine learning model 105 may analyze the CRM data using AI-driven segmentation algorithms implemented by the deep learning component 117. The imported CRM data may be used to identify customer categories. This may involve clustering users into groups such as, for example, "repeat buyers," "infrequent shoppers," or "high-value prospects," based on past behaviors and predicted future value. For example, the AI-driven digital marketing system 100 may categorize customers into behavioral groups-such as "high-value prospects" or "recent purchasers"—to improve targeting accuracy for future campaigns.

In operation S903, users (or the AI system itself) may define rules for event-based marketing automation through the user interface component 114, or such rules may be automatically inferred by the machine-learning-driven content optimizer component 110. These rules may map CRM events such as, e.g., invoice completion or appointment scheduling, to specific marketing actions like review requests or follow-up messages For example, these rules may tie specific events such as, e.g., "invoice paid," "appointment completed," or "product returned", to automated marketing actions like review requests, follow-up offers, or re-engagement messages.

In operation S904, when a trigger event is detected (e.g., a customer makes a payment), the content generation component 106 may automatically generate a personalized message, while the ad copy and SEO generator component 107 and social media and website content generator component 108 may provide tailored visuals or copy. The deep learning component 117 and the NLP component 120 may ensure alignment with tone, intent, and platform-specific constraints.

In operation S905, the generated message or asset may be deployed through the appropriate marketing channel which may include, for example, email, SMS, or a targeted ad campaign, by the third-party publishing component 109. Delivery timing, channel selection, and compliance preferences may be managed automatically.

In operation S906, engagement responses (e.g., open rates, click-throughs, replies, or completed actions) may be collected by the performance data collector component 113 and fed back into the training data database 118. This may be an iterative process in which the training data database 118 is iteratively trained based on the engagement responses. For example, this feedback may be used to refine future segmentation and continuously improve automation effectiveness through machine learning.

Figure 10:
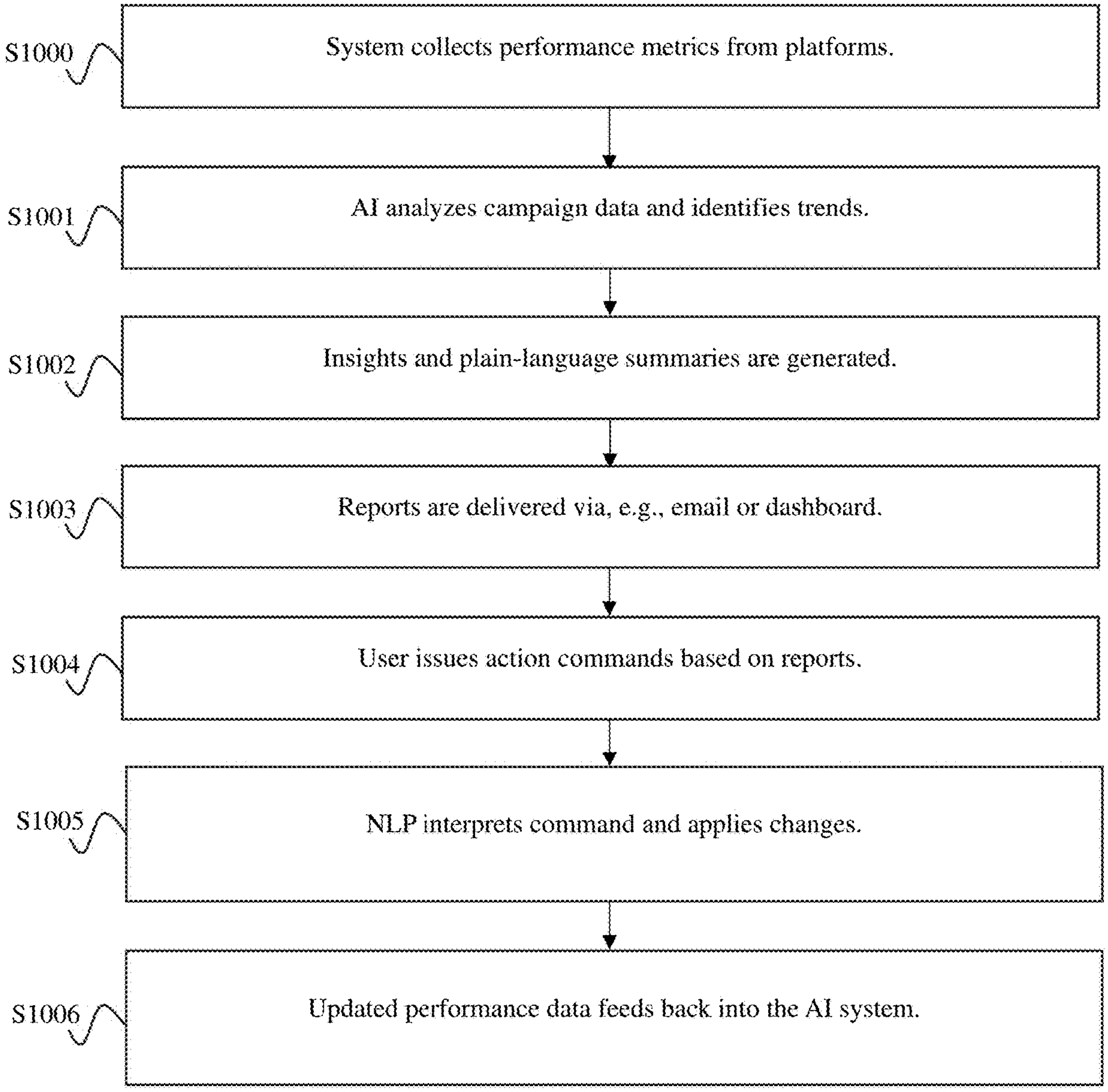
FIG. 10 is a flowchart illustrating AI-powered reporting of the AI-driven digital marketing system workflow, according to embodiments of the present disclosure.

FIG. 10 is a flowchart illustrating AI-powered reporting, showing how the AI-driven digital marketing system generates insights, delivers performance summaries, and accepts user feedback for continual improvement, according to embodiments of the present disclosure. The operations described with reference to FIG. 10 may be performed by the performance data collector component 113, the optimization summary generator component 112, the NLP component 120, and the training data database 118, all operating within or in communication with the machine learning model 105.

Referring to FIG. 10, in operation S1000, the performance data collector component 113 may collect campaign performance data from all connected third-party platforms via API integrations managed by the third-party publishing component 109. This may include metrics such as, for example, impressions, click-through rates (CTR), cost-per-click (CPC), conversions, bounce rates, time-on-site, and return on ad spend (ROAS), etc.

In operation S1001, the machine learning model 105 may process this incoming data using the neural network 116 and the deep learning component 117 to evaluate the effectiveness of current marketing efforts. Advanced algorithms may be used to identify, for example, trends, underperforming assets, audience engagement patterns, and budget utilization inefficiencies. The AI-driven digital marketing system 100 may detect patterns, identify underperforming elements, and diagnose inefficiencies in the marketing campaigns, leveraging historical data stored in the training data database 118.

In operation S1002, the optimization summary generator component 112 may generate user-facing reports that include, for example, charts, graphs, performance summaries, and actionable insights, in both visual/graphical and plain-language formats. The NLP component 120 may translate technical metrics into plain-language explanations and optimization suggestions for non-technical users. For example, the reports may be tailored for non-technical users and may include clear action suggestions such as, for example, "Increase spend on high-converting keyword" or "Replace underperforming headline."

In operation S1003, the completed report may be delivered to the user through, for example, the user interface component 114, email, or SMS. In some cases, reports may be scheduled for recurring delivery (e.g., weekly or monthly), or triggered by specific campaign events (e.g., crossing a spend threshold). The reports may include recommendations such as, for example, "Increase spend on high-performing ads" or "Update headline on underperforming page." Delivery schedules may be user-defined or triggered automatically based on campaign milestones.

In operation S1004, users may respond directly to the reports by replying to the reports or entering commands through the dashboard interface supported by the user interface component 114. Example responses include, for example, "Boost INSTAGRAM budget", "Double the budget on top campaign", "Pause ads targeting zip code 90210", "Add 10% to retargeting", etc.

In operation S1005, the NLP component 120 may interpret the user's intent and extract relevant data. If the instruction is complex, the AI-driven digital marketing system 100 may prompt the user for clarification via the user interface component 114 before proceeding.

In operation S1006, once confirmed, the requested updates may be executed through the third-party publishing component 109. The requested updates may be executed in real time. New campaign settings may be deployed, and updated performance results may be gathered by the performance data collector component 113 and stored in the training data database 118 for future optimization. The resulting performance data from these changes may be continuously fed back into the AI-driven digital marketing system, completing the feedback loop and enabling further refinement.

According to embodiments of the present disclosure, the AI-driven digital marketing system 100 may provide a lever-based service selection interface. For example, the AI-driven digital marketing system 100 may provide a graphical user interface (GUI) implemented by the user interface component 114, which presents a visual and interactive selection mechanism in the form of, e.g., a slider, lever, toggle, or functionally equivalent element. This element enables a user to configure their desired marketing service level by sliding a graphical control, hereinafter referred to as a "lever", from left to right.

FIGS. 11 and 12A-12E illustrate such a lever-based service selection interface according to embodiments of the present disclosure.

Figure 11:
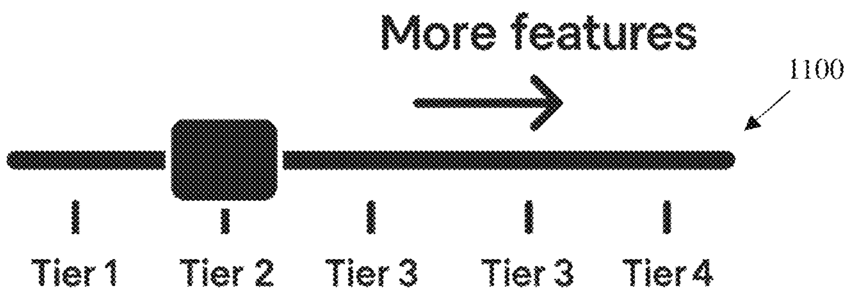
FIGS. 11 and 12A-12E illustrate a lever-based service selection interface, according to embodiments of the present disclosure.

As illustrated in FIG. 11, according to embodiments of the present disclosure, the AI-driven digital marketing system 100 may include a graphical user interface including an adjustable graphical selector 1100 configured to be displayed on the user device 101. The adjustable graphical selector 1100 is part of the graphical user interface and is configured to receive an input from the user via the user device 101 indicating a desired level of marketing services in response to the user adjusting the adjustable graphical selector 1100 across a service scale including a plurality of service tiers, as described further below with reference to FIGS. 12A-12E. The adjustable graphical selector 1100 may be, but is not limited to, a slider or a lever rendered as a horizontal bar with selectable or slidable regions. In some embodiments, the graphical lever may include, for example, notches, visual tiers, or tooltips that assist the user in understanding the scope of services available at each level. The AI-driven digital marketing system 100 may display a simplified representation of services when the lever is positioned on the leftmost side (e.g., a basic or entry-level service tier), and as the lever is incrementally moved to the right, the AI-driven digital marketing system 100 may dynamically reveal increasingly sophisticated marketing packages and functionality.

Each progressive tier of service, as illustrated in FIGS. 12A through 12E, may correspond to a bundle of AI-powered features such as, for example, website development, social media content generation, SEO configuration, customer review management, advertising campaign setup, or CRM integration.

Figure 12A:
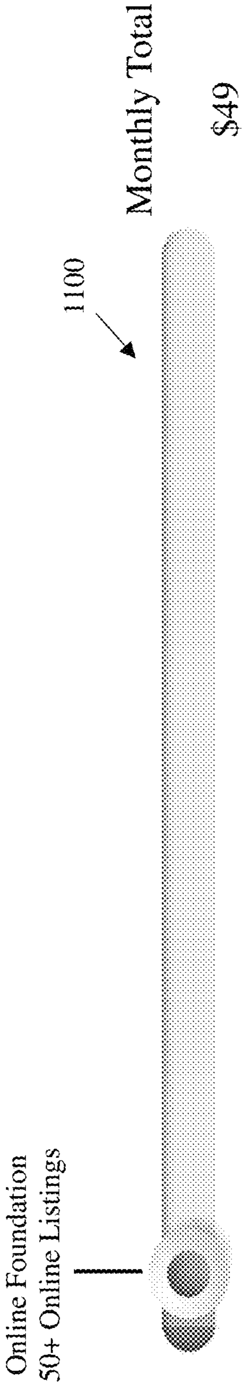
Figure 12B:
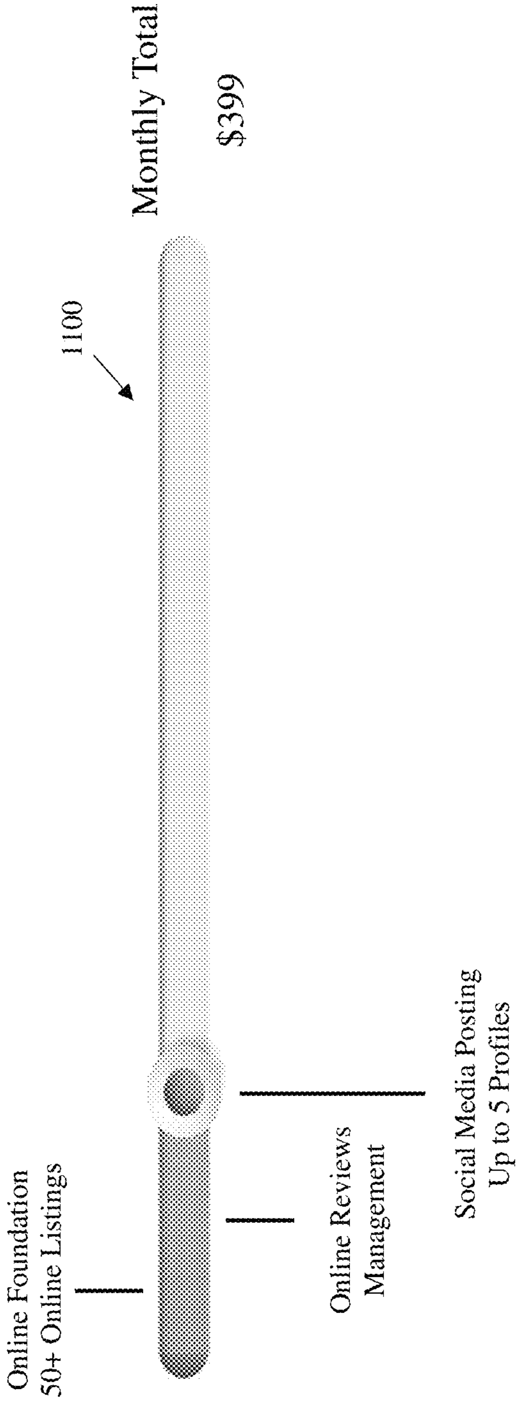

For example, as shown in FIG. 12A, the leftmost position of the lever may correspond to a package that includes online listings only. FIG. 12B illustrates an intermediate tier that includes review management and social media posting, along with the continued support for online listings. At this tier and higher tiers, the platform may request onboarding details such as, for example, business categories, location, and hours of operation, and may generate review request campaigns or a simple landing page site based on minimal user input.

Figure 12C:
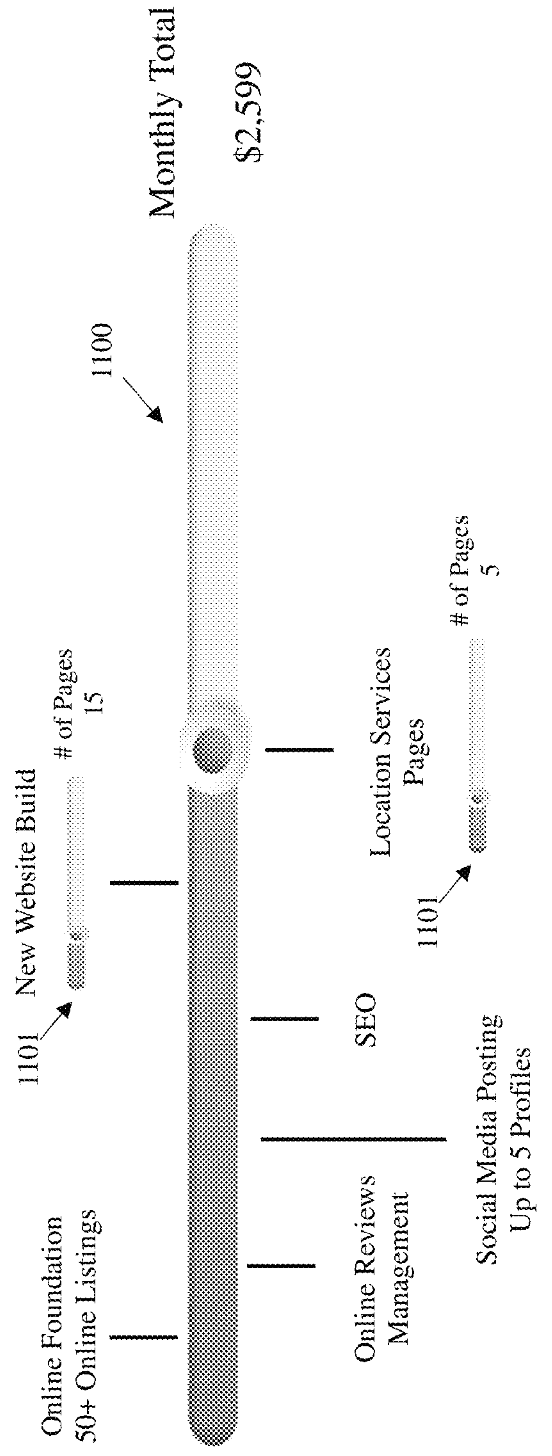

In FIG. 12C, the user has moved the lever further to the right to access a more advanced tier of marketing services. This tier may include all previous services as well as search engine optimization (SEO) configuration, website creation, and paid media campaign setup. At this level, the AI-driven digital marketing system 100 may activate the ad copy and SEO generator component 107 and may engage additional backend systems such as the content generation component 106 and the third-party publishing component 109 to produce and deploy search-targeted content. FIG. 12C also utilizes a sub-selector 1101 (e.g., a sub-lever), which may be rendered beneath or adjacent to the main lever. The sub-lever 1101 allows the user to configure granular settings specific to one of the unlocked services—for example, choosing specific options during website creation, and toggling between different geographic ad targeting modes (e.g., local, regional, or national reach). The utilization of sub-levers 1101 allows users to retain simplified control over complex AI-driven services without requiring detailed technical configuration.

Figure 12D:
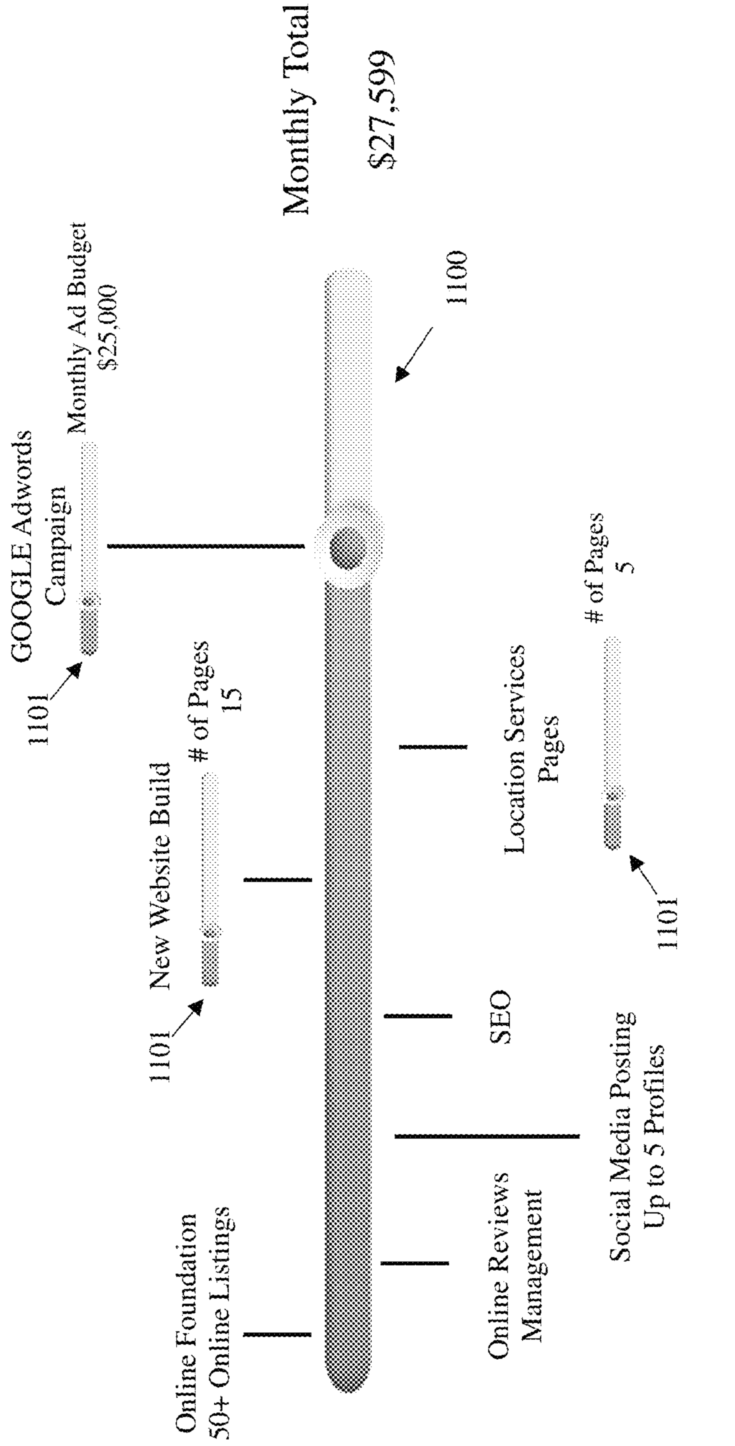

In FIG. 12D, the lever has been moved further to the right, unlocking a higher-tier package that includes social media content generation, enhanced CRM integration, and automated follow-up systems. These services may be implemented using the social media and website content generator component 108 and the CRM-connected modules of the AI-driven digital marketing system 100. The user interface component 114 may update visually to display new onboarding fields, such as social media login credentials, content preferences, or follow-up scheduling options. In this configuration, sub-levers 1101 are also present and may be used to fine-tune parameters such as, for example, posting frequency, selecting a preferred advertising channel (e.g., GOOGLE Ads, FACEBOOK Ads, etc.) or preferred social platforms (e.g., INSTAGRAM, LINKEDIN, etc.), or tone/style of posts (e.g., formal, casual, promotional). These sub-levers 1101 may influence the AI's content style generation and posting behavior, while keeping the user experience simple and intuitive.

Figure 12E:
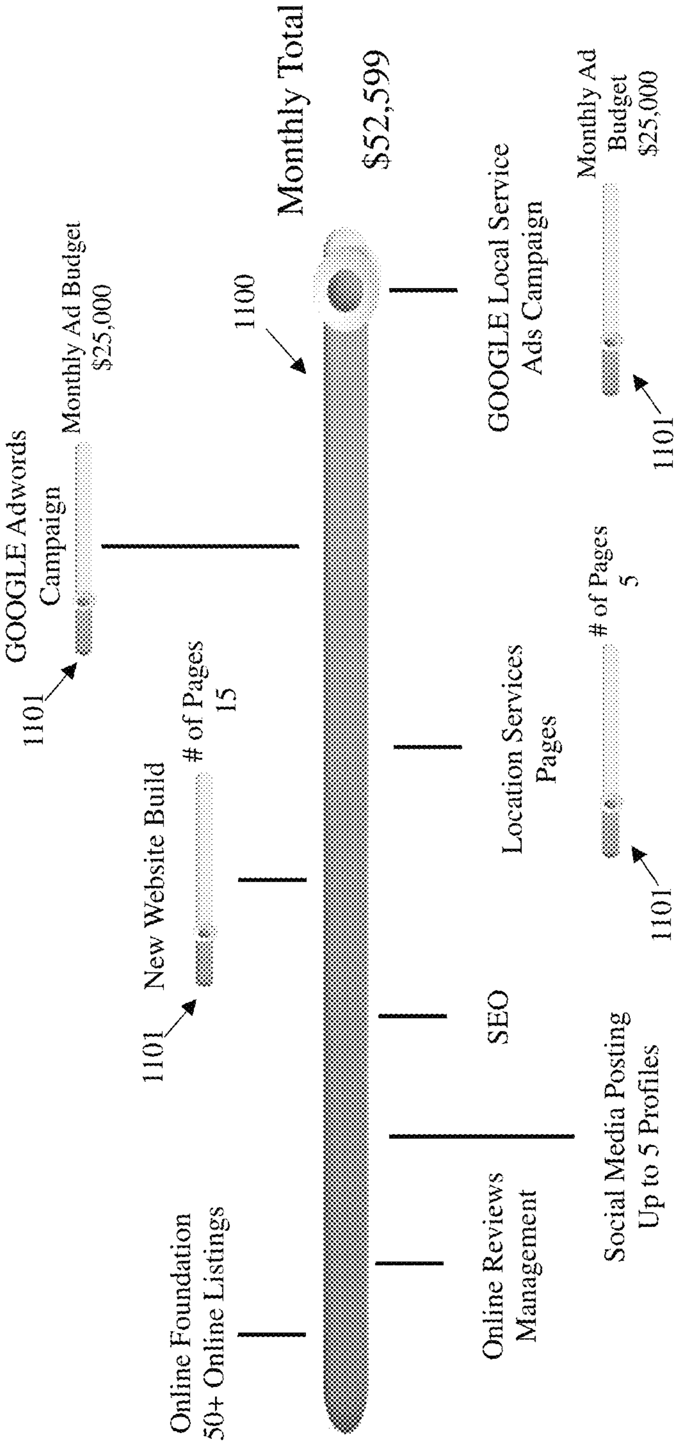

FIG. 12E illustrates the rightmost position of the main lever, corresponding to a full-service or enterprise-level package. This may include, for example, multichannel paid advertising, advanced automation, A/B testing, video content generation, and real-time optimization with AI feedback loops. In this tier, multiple sub-levers 1101 may be presented corresponding to different sections of the interface. These sub-levers 1101 may allow the user to activate bolt-on modules, such as, for example, a video rendering engine for property listings, or a dynamic review generator for reputation management. Other sub-levers 1101 may include campaign strategy options such as, for example, "aggressive," "balanced," or "budget-conscious," which influence how the machine learning model 105, including the deep learning component 117 and optimization summary generator component 112, automatically allocates resources across platforms. This tier may trigger full engagement of the machine learning model 105, which orchestrates, e.g., content creation, campaign optimization, performance data monitoring, and automated adjustments across all channels.

As the user adjusts the position of the lever, the service selection and form processing component 104 may trigger real-time updates to the onboarding interface, displaying additional form segments or follow-up questions specific to the selected tier. For example, if the lever is moved to a level that includes GOOGLE Ads configuration, the interface may request information about, e.g., ad budget, geographic targets, or desired keyword themes.

The visual interface may also include contextual animations or feedback effects rendered by the user interface component 114 to signal that the AI-driven digital marketing system 100 has registered the new tier selection. In some embodiments, modules associated with the newly selected tier may animate into view, fade in, or expand dynamically to indicate the unlocking of additional services. The AI-driven digital marketing system 100 may also incorporate, e.g., visual summaries, pricing estimates, and feature comparisons as the lever is moved between tiers.

The lever may also operate as a persistent control element. For example, after initial onboarding, users may return to the lever interface and adjust their tier selection at any time. Movement of the lever in real-time may cause the machine learning model 105 to automatically reconfigure the set of active services, deploy new campaigns, or deactivate components/modules no longer associated with the current tier. This dynamic adjustment process may involve, for example, the content generation component 106, the third-party publishing component 109, and the optimization summary generator component 112.

According to some embodiments, the lever interface may be embedded within a website, mobile app, or desktop platform. The lever may be implemented using modern rendering frameworks such as, for example, HTML5 Canvas, SVG (scalable vector graphics), or CSS (cascading style sheets) animations, and may be adapted for touch-based or mouse-based interaction. Each tier along the lever may be visually labeled with tier names such as, for example, "Basic," "Growth," "Advanced," "Full Service," etc., or may include contextual icons indicating the types of services bundled in each level.

By providing this intuitive, modular, and highly visual mechanism for service selection, the lever interface may facilitate user engagement, reduce complexity, and enable efficient configuration of personalized marketing strategies without requiring technical knowledge. FIGS. 11 and 12A through 12E collectively illustrate how the graphical lever can be used to progressively activate features in a visually informative and user-friendly manner. The inclusion of sub-levers 1101 in higher-tier configurations further enhances configurability without compromising usability.

According to embodiments of the present disclosure, the AI-driven digital marketing system 100 may include a graphical user interface provided by the user interface component 114 that presents the adjustable graphical selector 1100, such as, for example, the sliding lever displayed horizontally across a service scale, as described above. The adjustable graphical selector 1100 may be configured to receive user input via the user device 101, where movement of the adjustable graphical selector 1100 along the service scale indicates a selected service tier from a plurality of available service tiers.

Upon detecting a position of the adjustable graphical selector 1100, the machine learning model 105 may analyze the selected position to determine one or more marketing services associated with the selected service tier. The machine learning model 105 may then prompt the user for marketing input corresponding to the user's business and relevant to the selected marketing services. This marketing input may be received via dynamically presented form fields within the graphical user interface.

Using the received marketing input, the machine learning model 105 may generate one or more digital marketing assets. These digital marketing assets may include, for example, advertisements, website content, SEO metadata, or social media content. Once generated, the digital marketing assets may be transmitted over the Internet 119 to one or more digital delivery endpoints, such as, for example, paid advertising networks, website hosting platforms, or social media platforms.

In some embodiments, the adjustable graphical selector 1100 may be implemented as a sliding lever, as described above, allowing the user to visually and interactively select a service level. The graphical user interface may further include one or more sub-selectors 1101 associated with specific services within the selected tier. Each sub-selector 1101 may collect additional service-specific inputs from the user to customize individual components of the marketing program.

The machine learning model 105 may include an artificial neural network (ANN) 116, which may be employed to generate onboarding data corresponding to the determined services. This onboarding data may be transmitted to third-party digital platforms to activate or configure service accounts (e.g., to login to and access a service such as FACEBOOK, INSTAGRAM, etc.). In some cases, the ANN 116 may also retrieve online data from those platforms and supplement the marketing input based on such data. In some cases, the ANN 116 may transmit and publish digital assets to the third-party digital platforms, for example, cases in which the third-party digital platforms are the digital delivery endpoints.

In further embodiments, the machine learning model 105 may include a convolutional neural network (CNN) that analyzes visual media such as, for example, logos, photos, or social content, submitted by the user. The CNN may extract metadata or semantic attributes from these images to augment the marketing input or improve content generation.

Once digital assets have been published, the AI-driven digital marketing system 100 may receive campaign performance data from the digital delivery endpoints. This data may include metrics such as, for example, impressions, clicks, conversions, or engagement statistics. The reinforcement learning component 121 of the machine learning model 105 may adjust its internal parameters based on the performance data to optimize future campaign outcomes. The system may further update digital marketing assets accordingly and transmit an optimization summary to the user.

Additionally, as described above, the machine learning model 105 may include the deep learning component 117, which may be trained on the training data database 118. The deep learning component 117 may be configured to dynamically update the graphical user interface during onboarding by presenting follow-up questions or recommendations based on, for example, previously received user inputs, historical user behavior, or inferred marketing goals.

Finally, the AI-driven digital marketing system 100 may generate and send an automated status update to the user, confirming that the selected marketing services have been launched in accordance with the selected service tier and submitted inputs. This facilitates a low-friction, AI-assisted experience in which the user configures, launches, and optimizes a digital marketing program through intelligent interactions with the AI-driven digital marketing system 100.

FIGS. 13-17 are flowcharts illustrating operations performed by a system of performing automated digital marketing, according to embodiments of the present disclosure.

Figure 13:
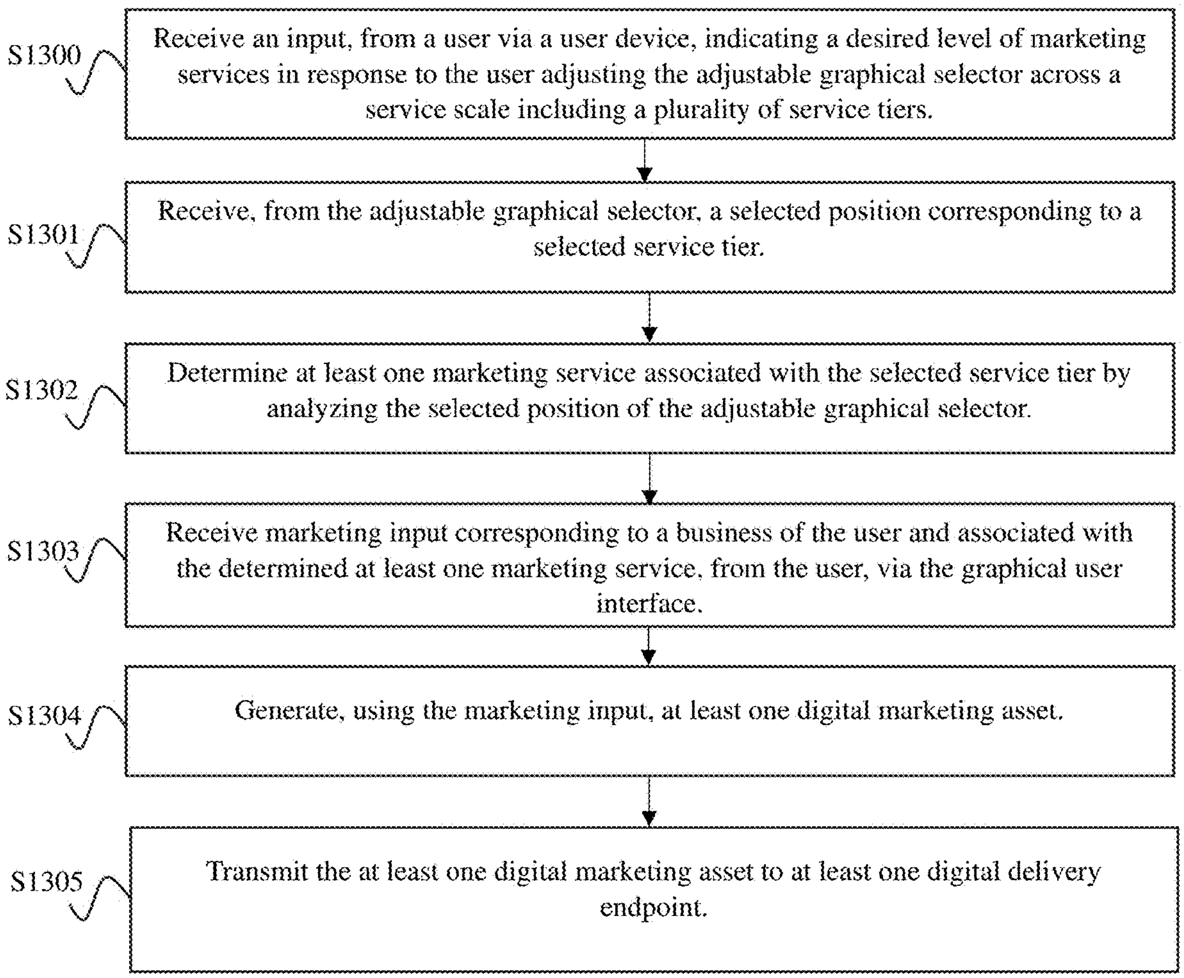
FIGS. 13-17 are flowcharts illustrating operations performed by a system of performing automated digital marketing, according to embodiments of the present disclosure.

Referring to FIG. 13, according to an embodiment of the present disclosure, a system of performing automated digital marketing includes the AI-driven digital marketing system 100 in communication with the machine learning model 105. The AI-driven digital marketing system 100 includes a graphical user interface including the adjustable graphical selector 1100 configured to be displayed on the user device. The adjustable graphical selector 1100 is part of the graphical user interface and is configured to receive an input, from the user via the user device 101, indicating a desired level of marketing services in response to the user adjusting the adjustable graphical selector 1100 across a service scale including a plurality of service tiers (S1300). The machine learning model 105 is configured to receive, from the adjustable graphical selector, a selected position corresponding to a selected service tier (S1301), determine at least one marketing service associated with the selected service tier by analyzing the selected position of the adjustable graphical selector (S1302), receive marketing input corresponding to a business of the user and associated with the determined at least one marketing service, from the user, via the graphical user interface (S1303), generate, using the marketing input, at least one digital marketing asset (S1304), and transmit the at least one digital marketing asset to at least one digital delivery endpoint (S1305).

In an embodiment, the adjustable graphical selector 1100 is a sliding lever displayed horizontally along the service scale.

In an embodiment, the graphical user interface further includes one or more sub-selectors 1101 corresponding to the selected service tier. Each sub-selector 1101 is displayed in association with a particular marketing service enabled by the selected service tier, and each sub-selector 1101 is configured to receive additional input from the user indicating one or more service-specific options for that particular marketing service.

Figure 14:
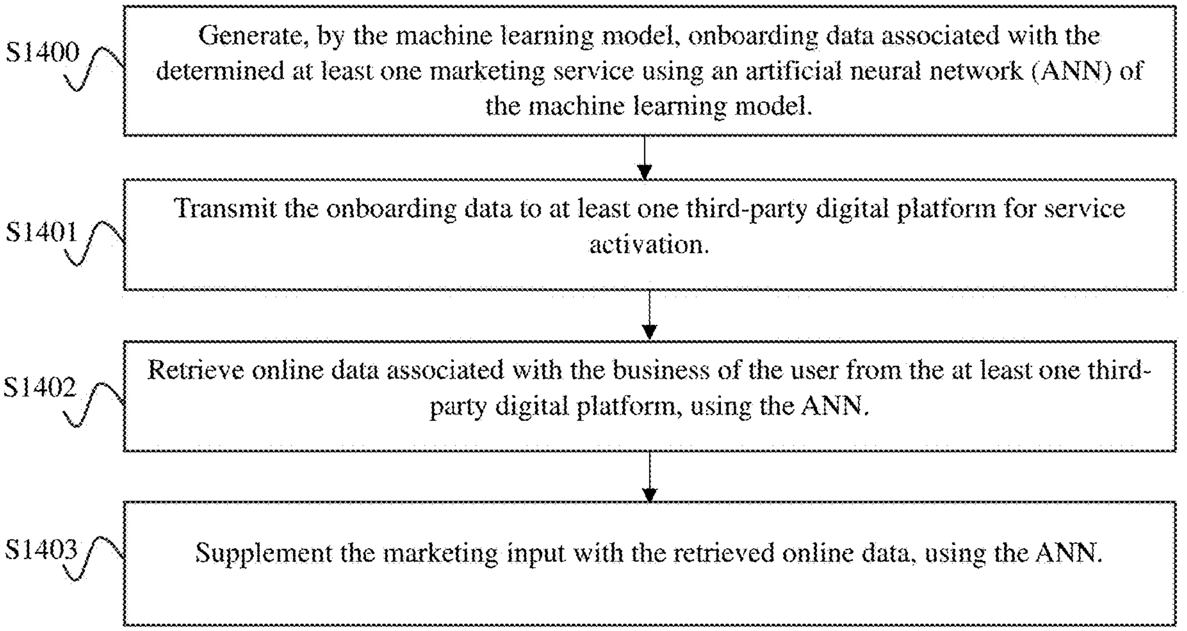

Referring to FIG. 14, in an embodiment, the machine learning model 105 includes an artificial neural network (ANN) 116 and is further configured to generate onboarding data associated with the determined at least one marketing service, using the ANN 116 (S1400), transmit the onboarding data to at least one third-party digital platform for service activation (S1401), retrieve online data associated with the business of the user from the at least one third-party digital platform, using the ANN 116 (S1402), and supplement the marketing input with the retrieved online data, using the ANN 116 (S1403).

In an embodiment, the at least one digital delivery endpoint is the at least one third-party digital platform.

Figure 15:
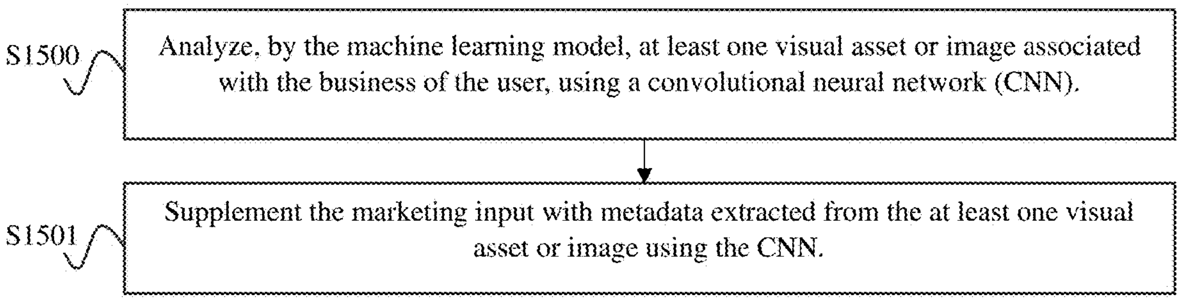

Referring to FIG. 15, in an embodiment, the machine learning model 105 includes a convolutional neural network (CNN) 116 and is further configured to analyze at least one visual asset or image associated with the business of the user, using the CNN 116 (S1500), and supplement the marketing input with metadata extracted from the at least one visual asset or image, using the CNN 116 (S1501).

In an embodiment, the at least one digital marketing asset includes at least one of an advertisement, website content, search engine optimization (SEO) metadata, and social media content.

In an embodiment, the digital delivery endpoint includes at least one of a paid advertising network, a website hosting platform, and a social media platform.

Figure 16:
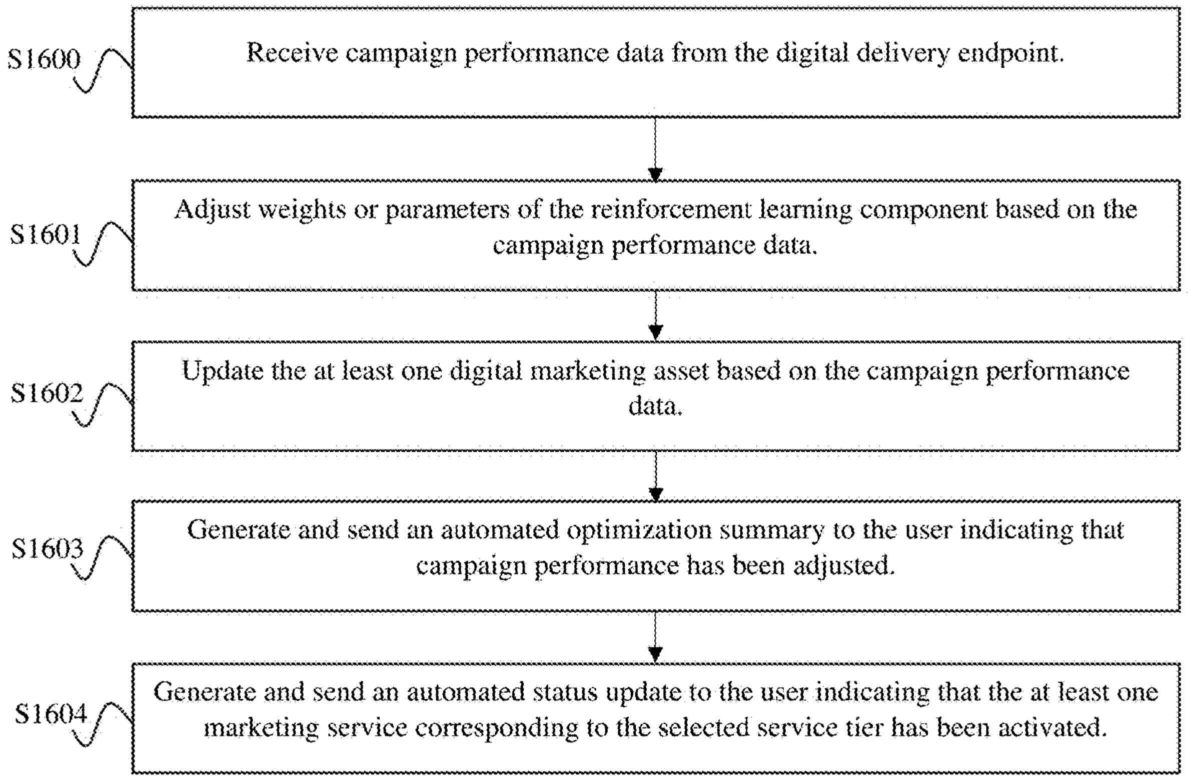

Referring to FIG. 16, in an embodiment, the machine learning model 105 includes the reinforcement learning component 121 and is further configured to receive campaign performance data from the digital delivery endpoint (S1600). The campaign performance data may include at least one of impressions, clicks, conversions, or engagement statistics. The machine learning model 105 is further configured to adjust weights or parameters of the reinforcement learning component based on the campaign performance data (S1601), update the at least one digital marketing asset based on the campaign performance data (S1602), generate and send an automated optimization summary to the user indicating that campaign performance has been adjusted (S1603), and generate and send an automated status update to the user indicating that the at least one marketing service corresponding to the selected service tier has been activated (S1604).

Figure 17:
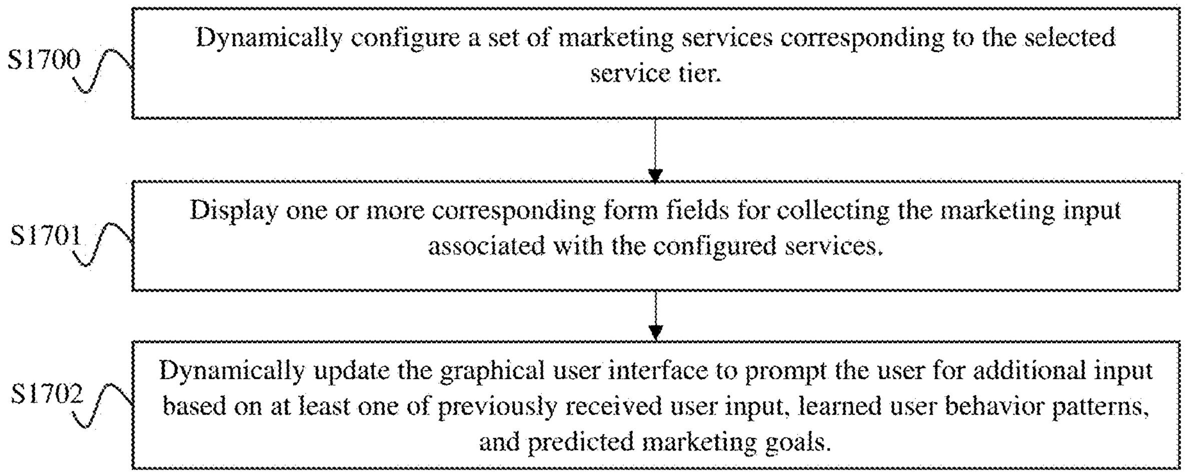

Referring to FIG. 17, in an embodiment, movement of the adjustable graphical selector 1100 to a given position causes the AI-driven digital marketing system 100 to dynamically configure a set of marketing services corresponding to the selected service tier (S1700), and display one or more corresponding form fields for collecting the marketing input associated with the configured services (S1701). In an embodiment, the machine learning model 105 includes the deep learning component 117 trained on the training data set 118 and is further configured to dynamically update the graphical user interface to prompt the user for additional input based on at least one of previously received user input, learned user behavior patterns, and predicted marketing goals (S1702).

Figure 18:
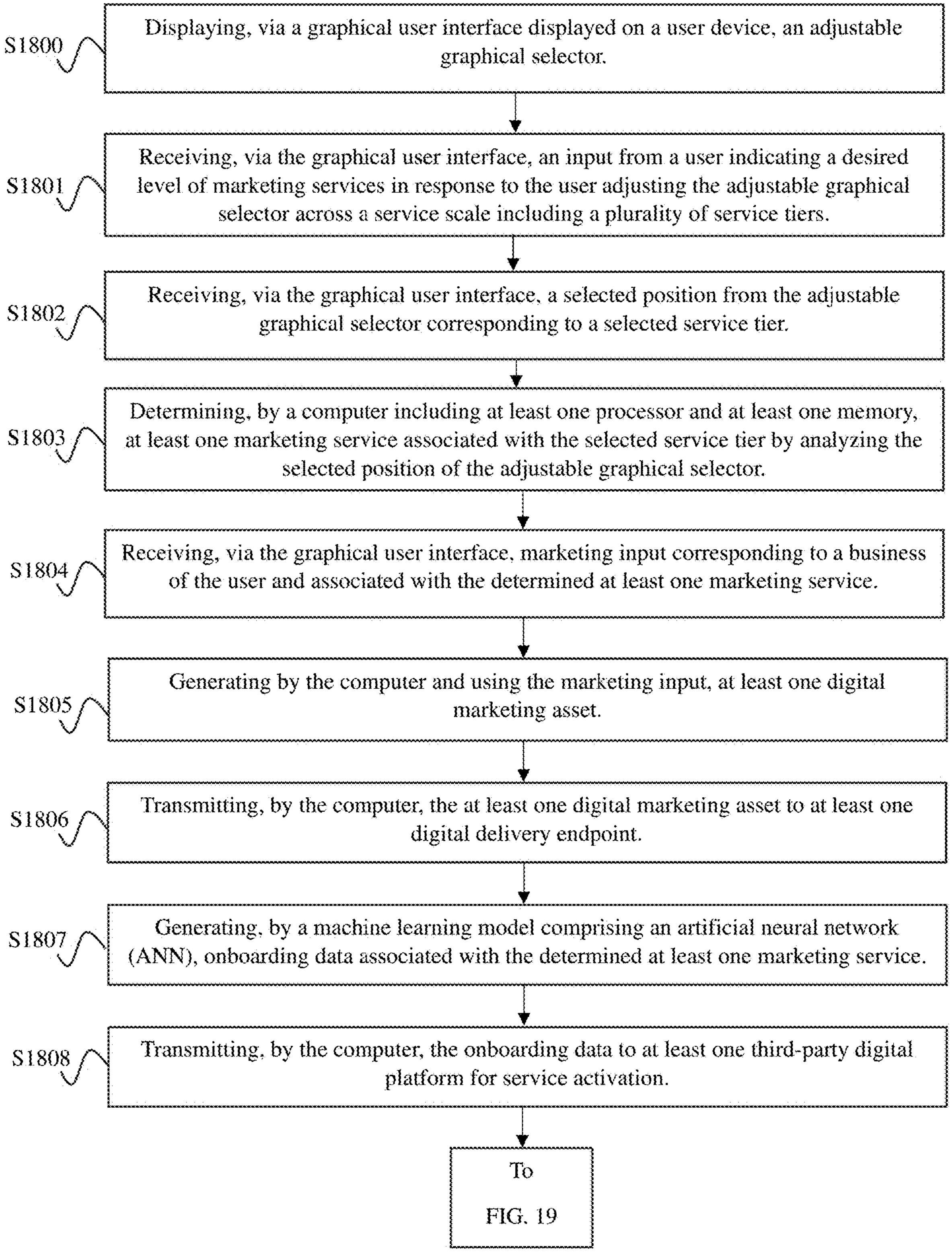
FIGS. 18-20 are flowcharts illustrating a computer-implemented method of performing automated digital marketing, according to embodiments of the present disclosure.
Figure 19:
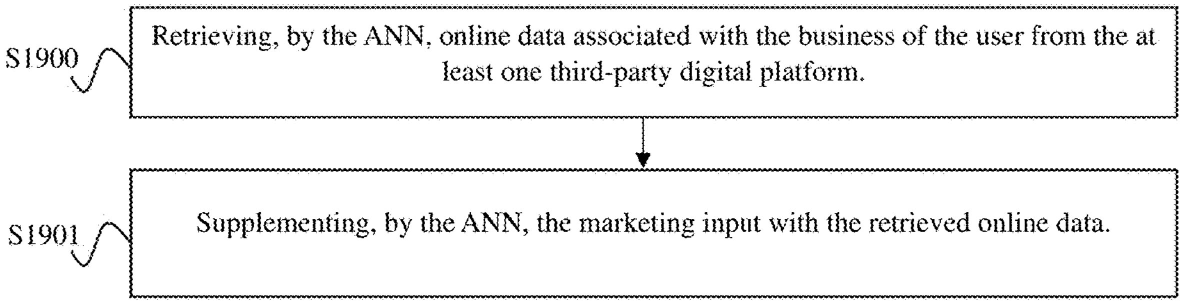
Figure 20:
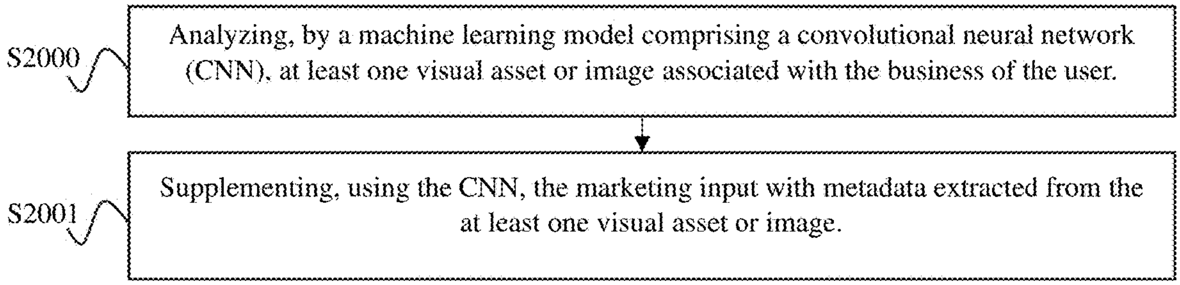

FIGS. 18-20 are flowcharts illustrating a computer-implemented method of performing automated digital marketing, according to embodiments of the present disclosure.

Referring to FIGS. 18 and 19, a computer-implemented method of performing automated digital marketing includes displaying, via a graphical user interface displayed on a user device, an adjustable graphical selector (S1800), receiving, via the graphical user interface, an input from a user indicating a desired level of marketing services in response to the user adjusting the adjustable graphical selector across a service scale including a plurality of service tiers (S1801), and receiving, via the graphical user interface, a selected position from the adjustable graphical selector corresponding to a selected service tier (S1802). The computer-implemented method further includes determining, by a computer including at least one processor and at least one memory, at least one marketing service associated with the selected service tier by analyzing the selected position of the adjustable graphical selector (S1803), receiving, via the graphical user interface, marketing input corresponding to a business of the user and associated with the determined at least one marketing service (S1804), generating by the computer and using the marketing input, at least one digital marketing asset (S1805), and transmitting, by the computer, the at least one digital marketing asset to at least one digital delivery endpoint (S1806).

In an embodiment, the computer-implemented method further includes generating, by the machine learning model 105 including the artificial neural network (ANN) 116, onboarding data associated with the determined at least one marketing service (S1807), transmitting, by the computer, the onboarding data to at least one third-party digital platform for service activation (S1808), retrieving, by the ANN 116, online data associated with the business of the user from the at least one third-party digital platform (S1900), and supplementing, by the ANN, the marketing input with the retrieved online data (S1901).

Referring to FIG. 20, in an embodiment, the computer-implemented method includes analyzing, by the machine learning model 105 including a convolutional neural network (CNN) 116, at least one visual asset or image associated with the business of the user (S2000), and supplementing, using the CNN, the marketing input with metadata extracted from the at least one visual asset or image (S2001).

Figure 21:
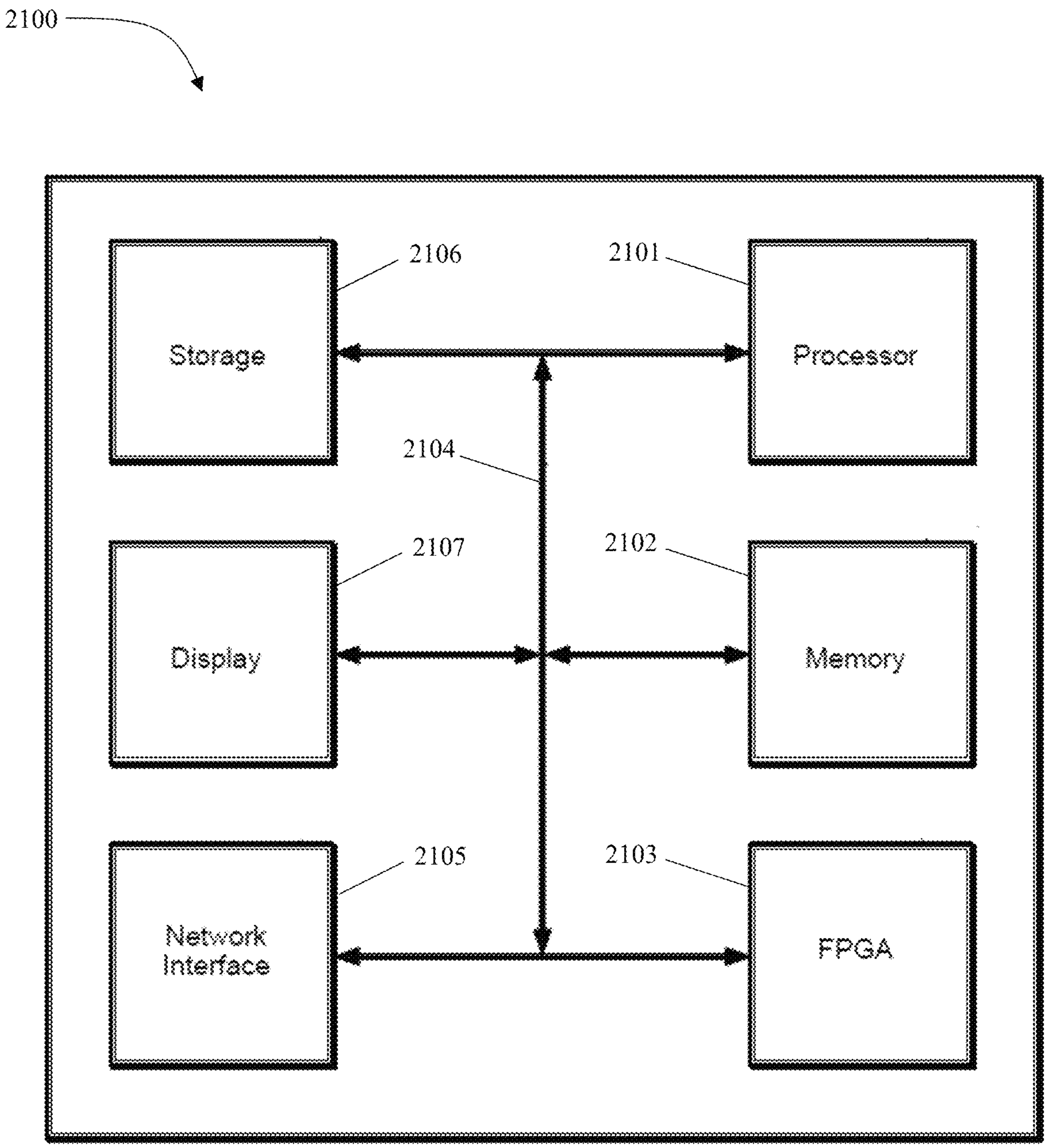
FIG. 21 is a block diagram of an exemplary computer for implementing the method of recruiting a candidate using the automated AI-driven job recruiting system according to aspects of the present disclosure.

FIG. 21 is a block diagram of an exemplary computer for implementing the method of performing automated digital marketing using the AI-driven digital marketing system 100 according to embodiments of the present disclosure.

Referring to FIG. 21, a general-purpose computer 2100 is described. The devices described herein (e.g., the AI-driven digital marketing system 100 and/or the machine learning model 105 of FIG. 1) may have the same or substantially the same structure as the computer 2100 or may incorporate at least some of the components of the computer 2100. The general-purpose computer 2100 can be employed to perform the various methods and algorithms described herein. The computer 2100 may include a processor 2101 connected to a computer-readable storage medium or a memory 2102 which may be a volatile type memory, e.g., RAM, or a non-volatile type memory, e.g., flash media, disk media, etc. The processor 2101 may be another type of processor such as, without limitation, a digital signal processor, a microprocessor, an ASIC, a graphics processing unit (GPU), field-programmable gate array (FPGA) 503, or a central processing unit (CPU).

In some aspects of the present disclosure, the memory 2102 can be random access memory, read-only memory, magnetic disk memory, solid state memory, optical disc memory, and/or another type of memory. The memory 2102 can communicate with the processor 2101 through communication buses 2104 of a circuit board and/or through communication cables such as serial ATA cables or other types of cables. The memory 2102 includes computer-readable instructions that are executable by the processor 2101 to operate the computer 2100 to execute the algorithms described herein. The computer 2100 may include a network interface 2105 to communicate (e.g., through a wired or wireless connection) with other computers or a server. A storage device 2106 may be used for storing data. The computer may include one or more FPGAs 2103. The FPGA 2103 may be used for executing various machine learning algorithms. A display 2107 may be employed to display data processed by the computer 2100.

Generally, the memory 2102 may store computer instructions executable by the processor 2101 to carry out the various functions described herein.

The computer 2100 may employ various artificial intelligence models, such as one or more machine learning models or algorithms.

Connections between the various modules, hardware, and other components described herein may be achieved through either wired or wireless connections, such as wireless connections through WIFI, BLUETOOTH, or other short range wireless communication protocols (e.g., radio frequencies).

As is traditional in the field of the present disclosure, embodiments are described, and illustrated in the drawings, in terms of functional blocks, units and/or components. Those skilled in the art will appreciate that these blocks, units and/or components are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or components being implemented by microprocessors or similar, they may be programmed using software (e.g., microcode) to perform various functions discussed herein and may optionally be driven by firmware and/or software. Alternatively, each block, unit and/or component may be implemented by dedicated hardware, or as a combination of dedicated hardware to perform some functions and a processor (e.g., one or more programmed microprocessors and associated circuitry) to perform other functions. Also, each block, unit and/or component of the embodiments may be physically separated into two or more interacting and discrete blocks, units and/or components without departing from the scope of the present disclosure. Further, the blocks, units and/or components of the embodiments may be physically combined into more complex blocks, units and/or components without departing from the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "component," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system of performing automated digital marketing, comprising:

an artificial intelligence (AI)-driven digital marketing system in communication with a machine learning model and comprising at least one processor and at least one memory storing instructions that, when executed by the at least one processor, cause the AI-driven digital marketing system to generate a graphical user interface including an adjustable graphical selector configured to be displayed on a user device, wherein the adjustable graphical selector is part of the graphical user interface and is configured to receive an input, from a user via the user device, indicating a desired level of marketing services in response to the user adjusting the adjustable graphical selector across a service scale including a plurality of service tiers, and wherein movement of the adjustable graphical selector to a given position causes the AI-driven digital marketing system to:

dynamically configure a set of marketing services corresponding to a selected service tier; and display one or more corresponding form fields for collecting the marketing input associated with the configured services, wherein displaying the one or more corresponding form fields comprises dynamically modifying a structure of the graphical user interface by automatically adding, removing, or rearranging the one or more corresponding form fields based on the given position of the adjustable graphical selector;

wherein the machine learning model includes a reinforcement learning component and is configured to:

receive, from the adjustable graphical selector, a selected position corresponding to the selected service tier;

determine at least one marketing service associated with the selected service tier by analyzing the selected position of the adjustable graphical selector;

receive marketing input corresponding to a business of the user and associated with the determined at least one marketing service, from the user, via the graphical user interface;

generate, using the marketing input, at least one digital marketing asset;

generate, using an artificial neural network (ANN), onboarding data associated with the determined at least one marketing service;

transmit the onboarding data to at least one third-party digital platform, wherein transmitting the onboarding data causes the at least one third-party digital platform to activate the at least one marketing service, and wherein transmitting the onboarding data comprises configuring the determined at least one marketing service on the at least one third-party digital platform based on the onboarding data;

transmit the at least one digital marketing asset to the at least one third-party digital platform;

receive, from the at least one third-party digital platform, campaign performance data comprising at least one of impressions, clicks, conversions, or engagement statistics;

adjust weights or parameters of the reinforcement learning component based on the campaign performance data;

update the at least one digital marketing asset based on the campaign performance data; and generate and send an automated status update to the user indicating that the at least one marketing service corresponding to the selected service tier has been activated.

2. The system of claim 1, wherein the adjustable graphical selector comprises a sliding lever displayed horizontally along the service scale.

3. The system of claim 1, wherein the machine learning model is further configured to:

retrieve online data associated with the business of the user from the at least one third-party digital platform, using the ANN; and supplement the marketing input with the retrieved online data, using the ANN.

4. The system of claim 1, wherein the machine learning model comprises a convolutional neural network (CNN), and is further configured to:

analyze at least one visual asset or image associated with the business of the user, using the CNN; and supplement the marketing input with metadata extracted from the at least one visual asset or image, using the CNN.

5. The system of claim 1, wherein the at least one digital marketing asset includes at least one of an advertisement, website content, search engine optimization (SEO) metadata, and social media content.

6. The system of claim 1, wherein the at least one third-party digital platform includes at least one of a paid advertising network, a website hosting platform, and a social media platform.

7. The system of claim 6, wherein the machine learning model is further configured to:

generate and send an automated optimization summary to the user indicating that campaign performance has been adjusted.

8. The system of claim 6, wherein the machine learning model is further configured to:

generate and send an automated status update to the user indicating that the at least one marketing service corresponding to the selected service tier has been activated.

9. The system of claim 1, wherein the machine learning model comprises a deep learning component trained on a training data set, and is further configured to:

dynamically update the graphical user interface to prompt the user for additional input based on at least one of previously received user input, learned user behavior patterns, and predicted marketing goals.

10. The system of claim 1, wherein the graphical user interface further includes one or more sub-selectors corresponding to the selected service tier, wherein each sub-selector is displayed in association with a particular marketing service enabled by the selected service tier, wherein each sub-selector is configured to receive additional input from the user indicating one or more service-specific options for that particular marketing service.

11. A computer-implemented method of performing automated digital marketing, comprising:

displaying, via a graphical user interface displayed on a user device, an adjustable graphical selector;

receiving, via the graphical user interface, an input from a user indicating a desired level of marketing services in response to the user adjusting the adjustable graphical selector across a service scale including a plurality of service tiers;

dynamically configuring a set of marketing services corresponding to a selected service tier;

displaying one or more corresponding form fields for collecting the marketing input associated with the configured services;

receiving, via the graphical user interface, a selected position from the adjustable graphical selector corresponding to the selected service tier;

determining, by a computer including at least one processor and at least one memory, at least one marketing service associated with the selected service tier by analyzing the selected position of the adjustable graphical selector;

receiving, via the graphical user interface, marketing input corresponding to a business of the user and associated with the determined at least one marketing service;

generating by the computer and using the marketing input, at least one digital marketing asset;

generating, by a machine learning model comprising an artificial neural network (ANN), onboarding data associated with the determined at least one marketing service;

transmitting the onboarding data to at least one third-party digital platform, wherein transmitting the onboarding data causes the at least one third-party digital platform to activate the at least one marketing service, wherein transmitting the onboarding data comprises configuring the determined at least one marketing service on the at least one third-party digital platform based on the onboarding data;

transmitting, by the computer, the at least one digital marketing asset to the at least one third-party digital platform;

receiving, from the at least one third-party digital platform, campaign performance data comprising at least one of impressions, clicks, conversions, or engagement statistics;

adjusting weights or parameters of a reinforcement learning component of the machine learning model based on the campaign performance data;

updating the at least one digital marketing asset based on the campaign performance data; and generating and sending an automated status update to the user indicating that the at least one marketing service corresponding to the selected service tier has been activated.

12. The computer-implemented method of claim 11, wherein the adjustable graphical selector comprises a sliding lever displayed horizontally along the service scale.

13. The computer-implemented method of claim 11, further comprising:

retrieving, by the ANN, online data associated with the business of the user from the at least one third-party digital platform; and supplementing, by the ANN, the marketing input with the retrieved online data.

14. The computer-implemented method of claim 11, further comprising:

analyzing, by the machine learning model, which further comprises a convolutional neural network (CNN), at least one visual asset or image associated with the business of the user; and supplementing, using the CNN, the marketing input with metadata extracted from the at least one visual asset or image.

15. The computer-implemented method of claim 11, wherein the at least one digital marketing asset includes at least one of an advertisement, website content, search engine optimization (SEO) metadata, and social media content.

* * * * *